US009715111B2

(12) United States Patent
Hird

(10) Patent No.: US 9,715,111 B2
(45) Date of Patent: Jul. 25, 2017

(54) SECURE USER INPUT MODE FOR ELECTRONIC DEVICES USING RANDOMIZED LOCATIONS OF SELECTION INDICIA

(71) Applicant: CA, Inc., New York, NY (US)

(72) Inventor: Geoffrey R. Hird, Cupertino, CA (US)

(73) Assignee: CA, Inc., New York, NY (US)

( * ) Notice: Subject to any disclaimer, the term of this patent is extended or adjusted under 35 U.S.C. 154(b) by 47 days.

(21) Appl. No.: 14/670,922

(22) Filed: Mar. 27, 2015

(65) Prior Publication Data

US 2016/0283724 A1    Sep. 29, 2016

(51) Int. Cl.
| G06F 21/00 | (2013.01) |
| G02B 27/01 | (2006.01) |
| G06F 3/0484 | (2013.01) |
| G06F 3/0482 | (2013.01) |
| G06F 21/31 | (2013.01) |
| G06F 21/35 | (2013.01) |
| G06F 21/83 | (2013.01) |

(52) U.S. Cl.
CPC ......... *G02B 27/017* (2013.01); *G06F 3/0482* (2013.01); *G06F 3/04842* (2013.01); *G06F 21/31* (2013.01); *G06F 21/35* (2013.01); *G06F 21/83* (2013.01); *G02B 2027/014* (2013.01); *G02B 2027/0178* (2013.01)

(58) Field of Classification Search
CPC .. G06F 21/604; G06F 3/0482; G06F 3/04842; G02B 27/017
See application file for complete search history.

(56) References Cited

U.S. PATENT DOCUMENTS

| 6,877,655 | B1* | 4/2005 | Robertson | G06Q 20/341 235/375 |
| 7,417,566 | B2* | 8/2008 | Pham | G06F 3/0236 341/173 |
| 8,745,518 | B2* | 6/2014 | Kornev | G06F 3/04886 345/157 |
| 2005/0052278 | A1* | 3/2005 | Midland | G07C 9/00158 340/5.82 |
| 2009/0058809 | A1* | 3/2009 | Vuong | G06F 3/0234 345/168 |
| 2009/0179778 | A1* | 7/2009 | Molla | G06F 3/018 341/22 |
| 2009/0271295 | A1* | 10/2009 | Hodge | G06Q 30/0601 705/26.1 |
| 2010/0123724 | A1* | 5/2010 | Moore | G06F 3/04817 345/473 |

(Continued)

*Primary Examiner* — Mohammad A Siddiqi
(74) *Attorney, Agent, or Firm* — Sage Patent Group

(57) ABSTRACT

Operations by an electronic device include randomly selecting an initial location among ordered keys for display of a selection indicia, and displaying on a display device the ordered keys containing symbols and the selection indicia at the initial location selected among the ordered keys. The operations further include moving the selection indicia from the initial location to a next location among the ordered keys responsive to a navigation signal from a user, and identifying one of the symbols as being selected by the user based on a present location of the selection indicia relative to one of the ordered keys containing the one of the symbols when a selection signal is received from the user. The one of the symbols is provided to an application as an input from the user.

18 Claims, 14 Drawing Sheets

(56) References Cited

U.S. PATENT DOCUMENTS

| | | | |
|---|---|---|---|
| 2011/0066975 A1* | 3/2011 | Kim | G06F 21/36 |
| | | | 715/810 |
| 2013/0047238 A1* | 2/2013 | Hwang | H04L 9/3228 |
| | | | 726/7 |
| 2013/0243187 A1* | 9/2013 | Horstmeyer | H04L 9/28 |
| | | | 380/28 |
| 2014/0241780 A1* | 8/2014 | Knighton | G06F 3/0205 |
| | | | 400/473 |
| 2015/0137944 A1* | 5/2015 | Fuerth | H04L 63/083 |
| | | | 340/5.85 |
| 2015/0212592 A1* | 7/2015 | Molla | G06F 3/0237 |
| | | | 345/169 |
| 2016/0170497 A1* | 6/2016 | Gardner | G06F 3/023 |
| | | | 345/168 |

* cited by examiner

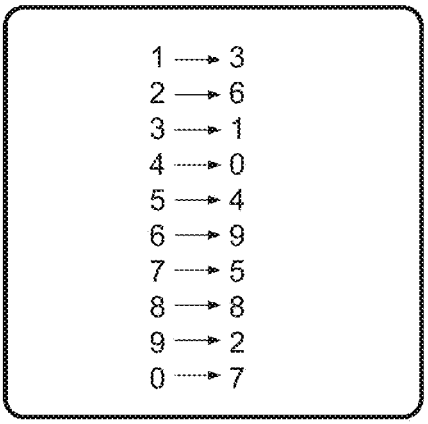
Figure 3a
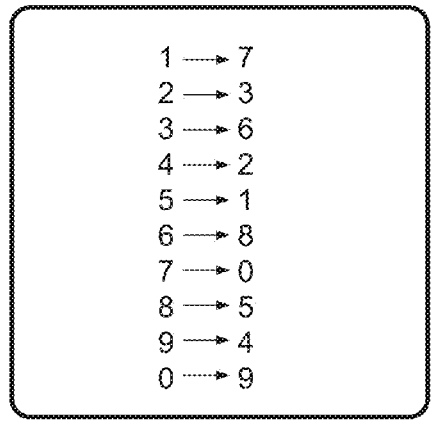
Figure 3b
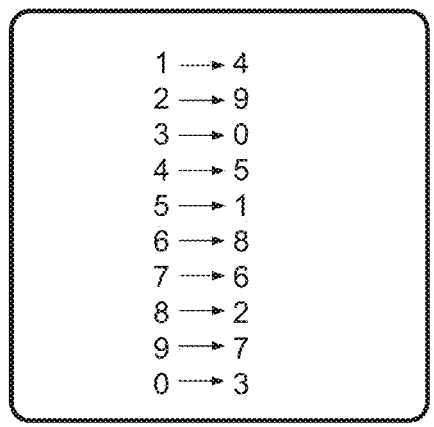
Figure 3c
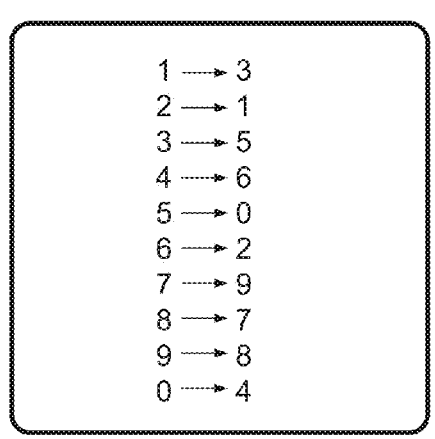
Figure 3d
| Numbers received and recognized via user speech recognition | Determined security PIN used to unlock user application feature |
|---|---|
| 3778 | "1199" |
Figure 4

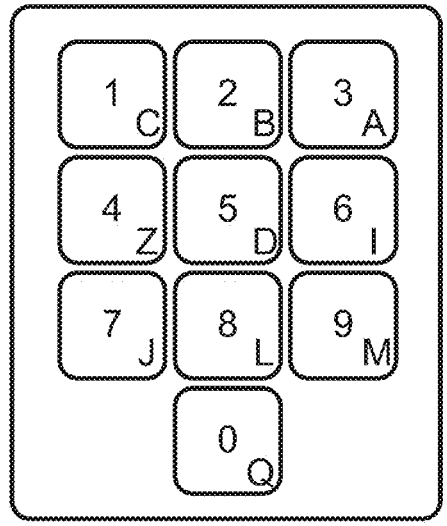
Figure 7a
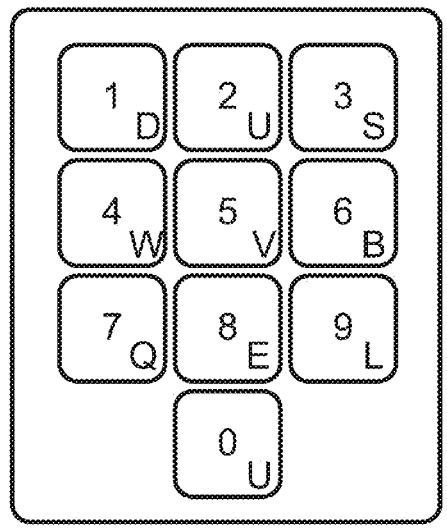
Figure 7b
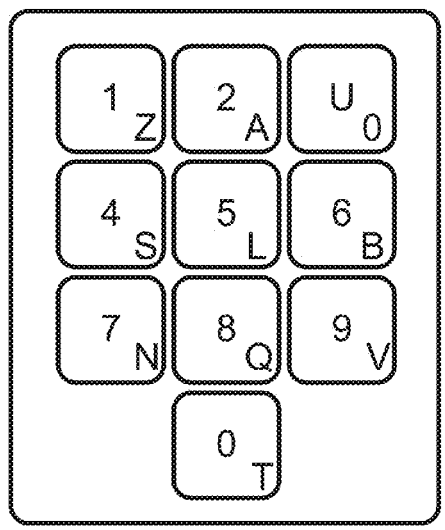
Figure 7c
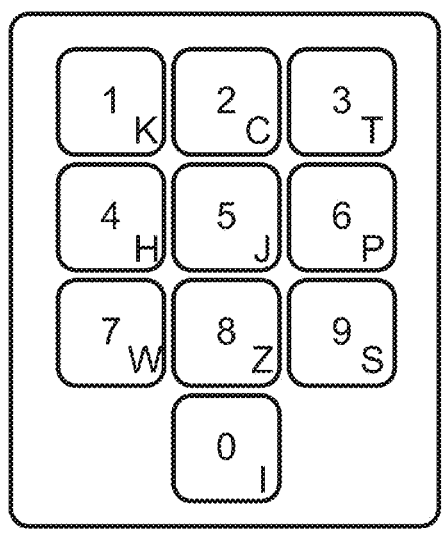
Figure 7d
| Characters received and recognized via user speech recognition | Determined security PIN used to unlock user application feature |
|---|---|
| BUTI | "2200" |
Figure 8

| Numeric characters received and recognized via user speech recognition | Determined mapping to keyboard symbols |
|---|---|
| 18 14 23 12 4 | "jones" |
| 30 | "return" |
| 28 4 1 25 28 15 13 | "SafeTy" |

| Numbers received and recognized via user speech recognition | Determined mapping to keyboard symbols |
|---|---|
| 18 20 ... | "jo..." |

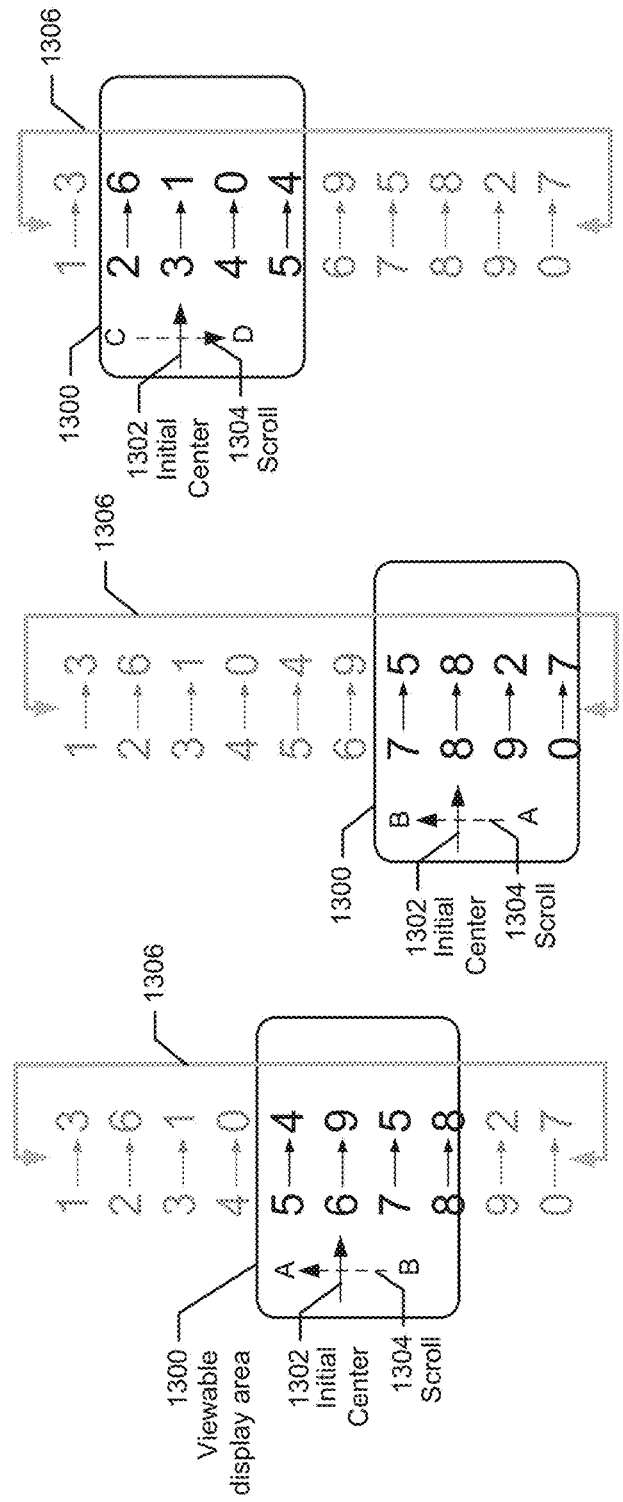

SECURE USER INPUT MODE FOR ELECTRONIC DEVICES USING RANDOMIZED LOCATIONS OF SELECTION INDICIA

BACKGROUND

The present disclosure relates to electronic devices and, more particularly, to user interfaces for portable electronic devices.

Portable electronic devices are rapidly evolving to include many types of wearable technologies. Advances in miniaturization and low-power display, processor, and wireless communication technologies have enabled smart watches, head-mounted display devices, and other wearable electronic devices to provide functionality that was once constrained to larger format transportable smart phones and tablet computers. For example, Google Glass is a wearable device having an optical head-mounted display and enables wearers to access the Internet and operate applications using natural language voice commands. Some smart watches can similarly allow user operation by natural language voice commands.

To activate Glass, wearers can tilt their heads a defined angle upward (which can be altered for preference) or tap the touchpad, and say "O.K., Glass." Once Glass is activated, wearers can say an action, such as "Take a picture", "Record a video", "Give me directions to . . . ", "Google ' . . . '", or "Send a message to . . . ". Search results and other responses can be read back to the wearer through a voice response relayed using bone conduction through a transducer that sits beside the ear, thereby rendering the sound almost inaudible to other people.

Although Glass' bone conduction transducer technology or headphones can make audio feedback to a wearer difficult for other persons to overhear, the wearer's voice commands to Glass, smart watches, and other portable electronic devices may be easily overheard by other persons. Privacy of such communications is therefore limited when operated in a public setting.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

Some embodiments of the present disclosure are directed to a computer program product that includes a non-transitory computer readable storage medium storing computer readable program code which when executed by a processor of a computer causes the processor to perform operations. The operations include randomly selecting an initial location among ordered keys for display of a selection indicia, and displaying on a display device the ordered keys containing symbols and the selection indicia at the initial location selected among the ordered keys. The operations further include moving the selection indicia from the initial location to a next location among the ordered keys responsive to a navigation signal from a user, and identifying one of the symbols as being selected by the user based on a present location of the selection indicia relative to one of the ordered keys containing the one of the symbols when a selection signal is received from the user. The one of the symbols is provided to an application as an input from the user.

Some other related embodiments of the present disclosure are directed to an electronic device that includes a display device, a user input interface, a processor, and a memory coupled to the processor and including computer readable program code that when executed by the processor causes the processor to perform operations. The operations include randomly selecting an initial location among ordered keys for display of a selection indicia, and displaying on a display device the ordered keys containing symbols and the selection indicia at the initial location selected among the ordered keys. The operations further include moving the selection indicia from the initial location to a next location among the ordered keys responsive to a navigation signal from a user, and identifying one of the symbols as being selected by the user based on a present location of the selection indicia relative to one of the ordered keys containing the one of the symbols when a selection signal is received from the user. The one of the symbols is provided to an application as an input from the user.

Other computer program products, electronic devices, and/or systems according to embodiments of the inventive subject matter will be or become apparent to one with skill in the art upon review of the following drawings and detailed description. It is intended that all such additional computer program products, electronic devices, and/or systems be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which:

FIGS. 3a-3d illustrate a sequence of displayed random mappings between a defined order set of symbols and a random order set of symbols responsive to a correspondence sequence of user selections among the displayed random order set of symbols, according to some embodiments of the present disclosure;

FIG. 4 illustrates numbers received by speech recognition of user selections among the sequence of random order sets of symbols displayed in FIGS. 3a-3d, and the corresponding determined security PIN according to some embodiments of the present disclosure;

FIGS. 7a-7d illustrate a sequence of numeric keypads having keys that are displayed with mappings between a defined order set of numbers and a random order set of letters, according to some embodiments of the present disclosure;

FIG. 8 illustrates operations for receiving characters by speech recognition of user selections among the randomly selected letters in FIGS. 7a-7d to determine a security PIN according to some embodiments of the present disclosure;

FIGS. 13a-13c illustrate a set of lists of adjacent pairs of symbols mapped between a defined order set of numbers and a random order set of numbers with the lists each having a randomly selected initial alignment in a display area, according to some embodiments of the present disclosure;

FIG. 14 illustrates operations for receiving numbers by speech recognition of user selections among the sequence of the random order set of numbers in FIGS. 13a-13c to determine a security PIN according to some embodiments of the present disclosure;

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As explained above, technologies have been developed to improve privacy while audio feedback is provided to a user of a portable electronic device, such as Google Glass or smart watch. However the user's voice commands to the portable electronic device may be easily overheard by other persons. Various embodiments of the present disclosure are directed to providing a more secure entry mode for receiving user data input to an electronic device, such as a portable electronic device.

Figure 1:
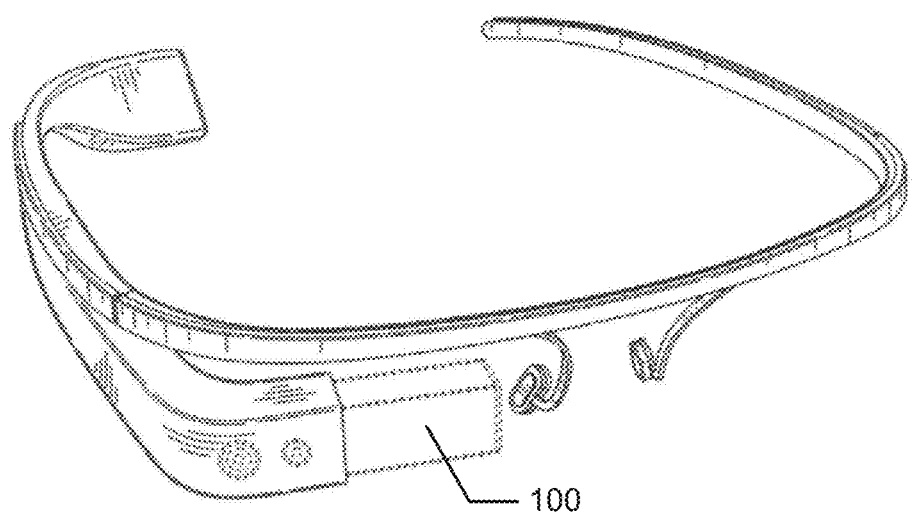
FIG. 1 is a block diagram of a portable electronic device having a display that can be worn on a user's head and operates according to at least some embodiments of the present disclosure.
Figure 2:
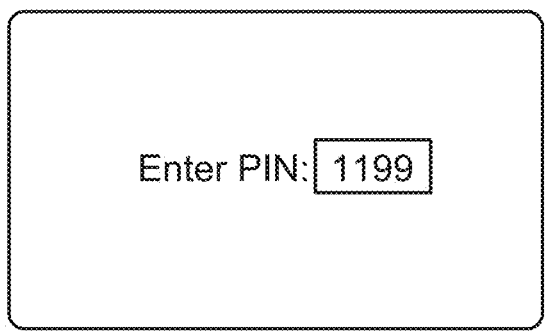
FIG. 2 illustrates a graphical screen that can be displayed for entry of a user's personal identification number.

FIG. 1 is a block diagram of a portable electronic device, such as Google Glass, having a display device 100 and electronic circuits that can be worn on a user's head and operated according to at least some embodiments of the present disclosure. The electronic device may alternatively be a smart watch or other wearable or portable device. FIG. 2 illustrates a graphical screen that can be displayed on the display device 100 for entry of a wearer's security personal identification number (PIN). During a PIN entry mode for a PIN authorization function of an application, the circuits display a prompt "Enter PIN" on the display device 100. In the example, the wearer must enter "1199" as the PIN to access the application. However, instead of the wearer speaking the necessary PIN for voice recognition by the electronic device, the wearer instead views mapping information displayed on the display device 100 that maps individual numbers of a defined order set to individual symbols (e.g., numbers, letters, graphical indicia, etc.) of a random order set. The wearer selects and speaks symbols from among the random order set, which the electronics translate to the necessary PIN using the mapping information. Accordingly, anyone overhearing the voice selections from the wearer without being able to also simultaneously view the displayed mapping information will not be able to properly decipher the necessary PIN. Security of the application is therefore maintained while being accessed in a public setting.

Figure 5:
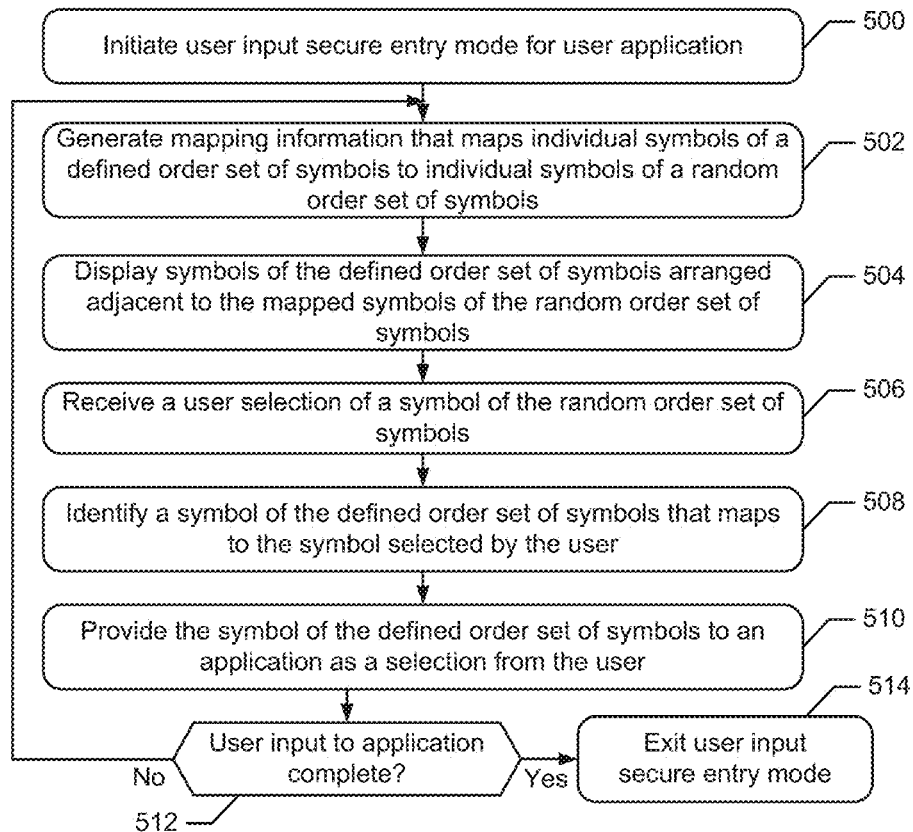
FIG. 5 is a flowchart of operations that may be performed by an electronic device to provide the displayed images of FIGS. 3a-3d and the operations of FIG. 4, according to some embodiments of the present disclosure.

FIGS. 3a-3d illustrate a sequence of displayed mappings between a defined order set of symbols and a random order set of symbols that are generated responsive to each of a series of user selections among the displayed random order set of symbols, according to some embodiments of the present disclosure. FIG. 4 illustrates numbers received by speech recognition of user selections among the sequence of random order sets of symbols displayed in FIGS. 3a-3d, and the corresponding security PIN determined therefrom according to some embodiments of the present disclosure. FIG. 5 is a flowchart of operations that may be performed by an electronic device to provide the displayed images of FIGS. 3a-3d and the operations of FIG. 4, according to some embodiments of the present disclosure Referring to FIGS. 3a-3d, 4, and 5, an application, an operating system, or a user of the electronic device can initiate (block 500, FIG. 5) a secure entry mode for providing user input to the application. During the secure entry mode, the electronic device generates (block 502, FIG. 5) mapping information that maps individual symbols of a defined order set of symbols to individual symbols of a random order set of symbols. Contents of the mapped symbols sets are displayed (block 504, FIG. 5) on a display device. More particularly, the displayed contents can include displaying symbols of the defined order set of symbols arranged adjacent to the mapped symbols of the random order set of symbols, based on the mapping information.

In the example of FIG. 3a, the displayed mapping information provides a left column of sequentially increasing numbers ("1 . . . 0") as the ordered set of symbols and a right column of randomly ordered numbers ("3 . . . 7") as the random order set of symbols. Further to the example of FIG. 2 where a user desires to enter "1199" into a PIN authorization function of an application, the user refers to the mapping information displayed in FIG. 3a to lookup the first PIN number (i.e., "1") shown in the defined order left column to identify the mapped randomly ordered number (i.e., "3") shown in the random ordered right column. The user speaks the number "3", which the electronic device receives (block 506, FIG. 5) and recognizes through voice recognition operations. The electronic device matches the received number "3" to an entry in the random order right column to identify (block 508, FIG. 5) the mapped number in the defined order left column (i.e., "1"). The identified number "1" from the defined order left column is provided (block 510, FIG. 5) to the PIN authorization function of the application.

Because the user's PIN input to the PIN authorization function is not yet complete (determined at Block 512), the user sequentially enters the other PIN numbers by repeating the operations of Blocks 502-510. Further security is provided by, before each of the repetitions, replacing the random order set of symbols (right column) with another random order set of symbols to use for the generating (block 502), the displaying (block 504), the receiving (block 506), the identifying (block 508), and the providing (block 510).

These repeated operation are further explained in detail for the other three PIN numbers. Continuing the example PIN entry for the second PIN number (i.e., "1"), the electronic device generates (block 502) new mapping information that maps the defined order left column of numbers (i.e., "1 . . . 0") to a new random order right column of numbers (i.e., "7 . . . 9"), and displays (block 504) the adjacent columns of numbers as shown in FIG. 3b. The user refers to the mapping information displayed in FIG. 3b to lookup the second PIN number (i.e., "1") shown in the defined order left column to identify the mapped number (i.e., "7") shown in the random order right column. The user speaks the number "7", which the electronic device receives (block 506) and recognizes through voice recognition operations. The electronic device matches the number "7" to an entry in the random order right column to identify (block 508) the mapped number in the defined order left column (i.e., "1"). The identified number "1" from the defined order left column is provided (block 510, FIG. 5) to the PIN authorization function of the application.

Continuing the example PIN entry for the third PIN number (i.e., "9"), the electronic device generates (block 502) new mapping information that maps the defined order left column of numbers (i.e., "1 . . . 0") to a new random order right column of numbers (i.e., "4 . . . 3"), and displays (block 504) the adjacent columns of numbers as shown in FIG. 3c. The user refers to the mapping information displayed in FIG. 3c to lookup the third PIN number (i.e., "9") shown in the defined order left column to identify the mapped number (i.e., "7") shown in the random ordered right column. The user speaks the number "7", which the electronic device receives (block 506) and recognizes through voice recognition operations. The electronic device matches the number "7" to an entry in the random order right column to identify (block 508) the mapped number in the defined order left column (i.e., "9"). The identified number "9" from the defined order left column is provided (block 510, FIG. 5) to the PIN authorization function of the application.

Continuing the example PIN entry for the fourth PIN number (i.e., "9"), the electronic device generates (block 502) new mapping information that maps the defined order left column of numbers (i.e., "1 . . . 0") to a new random order right column of numbers (i.e., "3 . . . 4"), and displays (block 504) the adjacent columns of numbers as shown in FIG. 3d. The user refers to the mapping information displayed in FIG. 3d to lookup the fourth PIN number (i.e., "9") shown in the defined order left column to identify the mapped number (i.e., "8") shown in the random ordered right column. The user speaks the number "8", which the electronic device receives (block 506) and recognizes through voice recognition operations. The electronic device matches the number "8" to an entry in the random order right column to identify (block 508) the mapped number in the defined order left column (i.e., "9"). The identified number "9" from the defined order left column is provided (block 510, FIG. 5) to the PIN authorization function of the application.

Referring to FIG. 4, the users thereby speaks the number sequence "3778" pursuant to the respective sequence of displayed mapping information of FIGS. 3a-3d to cause the electronic device to provide the number sequence "1199" to the PIN authorization function of the application. When the user input to the PIN authorization function of the application is complete (block 512), the secure entry mode for user input can be terminated (block 514).

Figure 6:
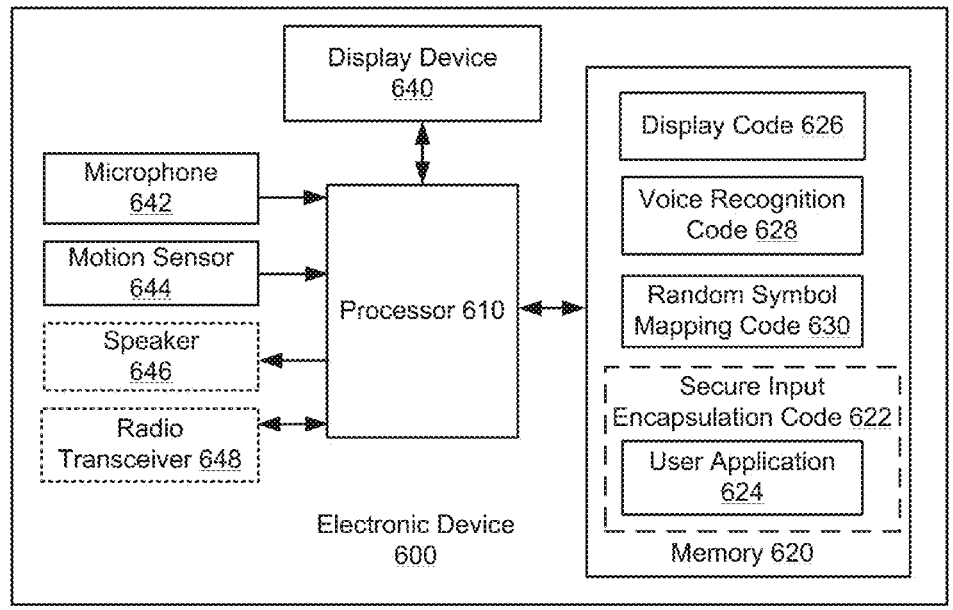
FIG. 6 is a block diagram of an electronic device configured according to some embodiments of the present disclosure.

FIG. 6 is a block diagram of an electronic device 600 configured according to some embodiments of the present disclosure. Referring to FIG. 6, the electronic device 600 includes a processor 610, a memory 620, a display device 640, a microphone 642 (or other user input interface), and a network interface which may include a radio access network transceiver 648 and/or a wired network interface (e.g., Ethernet interface). The radio access network transceiver 648 can include, but is not limited to, a Bluetooth, WLAN transceiver (IEEE 802.11), WiMax transceiver, LTE or other cellular transceiver, or other radio communication transceiver configured to communicate with a radio access network which may form part of a wide area network (e.g., Internet). The electronic device 600 may further include a motion sensor 644 (e.g., accelerometers, tilt meter, etc.), speaker 648, and other components such as a physical user input interface 520 (e.g., touch screen, keyboard, keypad, etc.)

The processor 610 may include one or more data processing circuits, such as a general purpose and/or special purpose processor (e.g., microprocessor and/or digital signal processor) that may be collocated or distributed across one or more networks. The processor 610 is configured to execute computer program code in the memory 620, described below as a non-transitory computer readable medium, to perform at least some of the operations described herein as being performed by an access control computer. The computer program code when executed by the processor 610 causes the processor 610 to perform operations in accordance with one or more embodiments disclosed herein for an electronic device.

The computer program code can include display code 626 that displays information on the display device 640, voice-recognition code 628 that operates to recognize spoken words by the user, and random symbol mapping code 630 operates according to one or more embodiments disclosed herein to generate and use mapping information that maps individual symbols of a defined order set of symbols to individual symbols of a random order set of symbols.

The computer program code can further include a user application 624 which may be encapsulated by secure input encapsulation code 622. The secure input encapsulation code 622 may "wrap around" the user application 624 to intercept or otherwise observe application programming interface (API) calls from the application 624 to another application program processed by the electronic device 600, an operating system processed by the electronic device 600, and/or other software/hardware resources of the electronic device 600. The secure input encapsulation code 622 may similarly intercept or otherwise observe API calls from the other application programs, the operating system, and/or the other software/hardware resources to the application 624.

As used herein, an "API call" can be any signaling occurring from one to another software application that may be performed using a defined syntax and one or more parameters (e.g., data structure, object classes, and/or variables) to obtain data therefrom and/or to provide data thereto. For example, SOAP and REST service requests can be performed using a defined API library of remote calls or other types of API calls.

Accordingly, a secure entry mode as disclosed herein may be performed based on the secure input encapsulation code 622 intercepting API calls relating to, for example, a secure PIN entry mode, a password entry mode, or other operational mode of the user application 624 that may benefit from providing the user mapping information to avoid having the user speak or otherwise attempt to input sensitive information to the application 624 in a manner than could be learned by a nearby person. The secure input encapsulation code 622 can trigger operation of the random symbol mapping code 630, the display code 626, and the voice recognition code 628 to perform one or more operations disclosed herein for mapping user selections among a random order set of symbols to corresponding symbols in a defined order set of symbols to identify symbols to be provided to the application 624 as selections from a user.

FIGS. 7a-7d illustrate a sequence of numeric keypads having keys that are displayed with mappings between a defined order set of numbers and a random order set of letters, according to some embodiments of the present disclosure. FIG. 8 illustrates operations for receiving characters by speech recognition of user selections among the randomly selected letters in FIGS. 7a-7d to determine a security PIN according to some embodiments of the present disclosure.

Referring to FIGS. 7a-7d and 8, an application, an operating system, or a user of an electronic device can initiate a secure entry mode for providing user input to the application. As shown in FIG. 8, the user desires to input a security PIN "2200" to an application to unlock a feature. During the secure entry mode, the electronic device generates mapping information that maps individual symbols of a defined order set of symbols to individual symbols of a random order set of symbols. The numeric keypad is displayed with a plurality of graphical keys containing different pairings of the symbols mapped between the defined order set of symbols and the random order set of symbols based on the mapping information. The random order set of symbols may be selectively displayed adjacent to the conventional sequence of numbers within the graphical keys based on whether a secure entry mode is active or based on another defined condition. When not operating in the secure entry mode the keypad may be displayed with only the conventional sequence of numbers within the graphical keys.

In the example of FIGS. 7a-7d, the electronic device displays within or adjacent to each of the graphical keys, or within or adjacent to at least some of the graphical keys, a number selected among the defined order set of symbols and a letter selected among the random order set of symbols that is mapped to the number based on the mapping information. The random order set of symbols may be numbers, letters, characters, and/or other graphical symbols.

For example, in FIG. 7a a key is displayed with the ordered number "1" adjacent to a random mapped letter "C", the next key is displayed with the ordered number "2" and a random mapped letter "B", the next key is displayed with the ordered number "3" adjacent to a random mapped letter "A", with further each of the other ordered number keys being similarly displayed with the respective key number adjacent to a respective randomly mapped letter. Alternatively or additionally, the ordered number keys may be displayed with randomly mapped numbers adjacent to the defined ordered numbers. As used herein, the term randomly includes pseudo-random sequences, and other numeric sequences that inhibit prediction of the sequence by a person who is not able to view the displayed sequence. The randomly selected letters, numbers, or other symbols should be unique within the displayed keypad (e.g. each numbered key should be mapped to a unique letter).

The user refers to the keypad displayed in FIG. 7a to lookup the first PIN number (i.e., "2") to identify the mapped random ordered letter (i.e., "B") shown. The user speaks the letter "B", which the electronic device receives and recognizes through voice recognition operations. The electronic device uses the mapping information to match the received letter "B" to the number "2" which it provides to the PIN authorization function of the application.

Because the user's PIN input to the PIN authorization function is not yet complete, the user sequentially enters the other PIN numbers by repeating looking-up with other keypad keys corresponding to the next three PIN numbers to identify the corresponding random order letters on those keypad keys. Further security is provided by, before each of the repetitions, generating new mapping information so that they keypad is refreshed to display newly mapped random letters in each of the number keys.

These repeated operations are further explained in detail for the other three PIN numbers. Continuing the example PIN entry for the second PIN number (i.e., "2"), the electronic device generates new mapping information and displays a new set of random letters in the keys as shown in FIG. 7b. The user refers to the keypad displayed in FIG. 7b to lookup the second PIN number (i.e., "2") to identify the mapped random ordered letter (i.e., "U") shown. The user speaks the letter "U", which the electronic device receives and recognizes through voice recognition operations. The electronic device uses the mapping information to match the received letter "U" to the number "2" which it provides to the PIN authorization function of the application.

Continuing the example PIN entry for the third PIN number (i.e., "0"), the electronic device generates new mapping information and displays a new set of random letters in the keys as shown in FIG. 7c. The user refers to the keypad displayed in FIG. 7c to lookup the third PIN number (i.e., "0") to identify the mapped random ordered letter (i.e., "T") shown. The user speaks the letter "T", which the electronic device receives and recognizes through voice recognition operations. The electronic device uses the mapping information to match the received letter "T" to the number "0" which it provides to the PIN authorization function of the application.

Continuing the example PIN entry for the fourth PIN number (i.e., "0"), the electronic device generates new mapping information and displays a new set of random letters in the keys as shown in FIG. 7d. The user refers to the keypad displayed in FIG. 7d to lookup the fourth PIN number (i.e., "0") to identify the mapped random ordered letter (i.e., "I") shown. The user speaks the letter "I", which the electronic device receives and recognizes through voice recognition operations. The electronic device uses the mapping information to match the received letter "I" to the number "0" which it provides to the PIN authorization function of the application.

Referring to FIG. 8, the users thereby speaks the character sequence "BUTI" pursuant to the respective sequence of displayed keypads of FIGS. 7a-7d to cause the electronic device to provide the number sequence "2200" to the PIN authorization function of the application.

It is noted that the numbers of the defined order set of numbers displayed in the keypad of FIGS. 7a-7d are each compatible for operation of the PIN authorization function of the application. In sharp contrast, the letters of the random order set of letters are not compatible for operation of the PIN authorization function of the application. Consequently, anyone overhearing the voice selections by the user without being able to also simultaneously view the displayed sequence of keypads will not be able to properly decipher the necessary PIN. Moreover, the other person would overhear a sequence of letters which are incompatible for operation of the PIN authorization function of the application and are likely to deceive the other person as to what operational function (e.g., PIN entry) is being performed by the user.

Figures 9, 10:
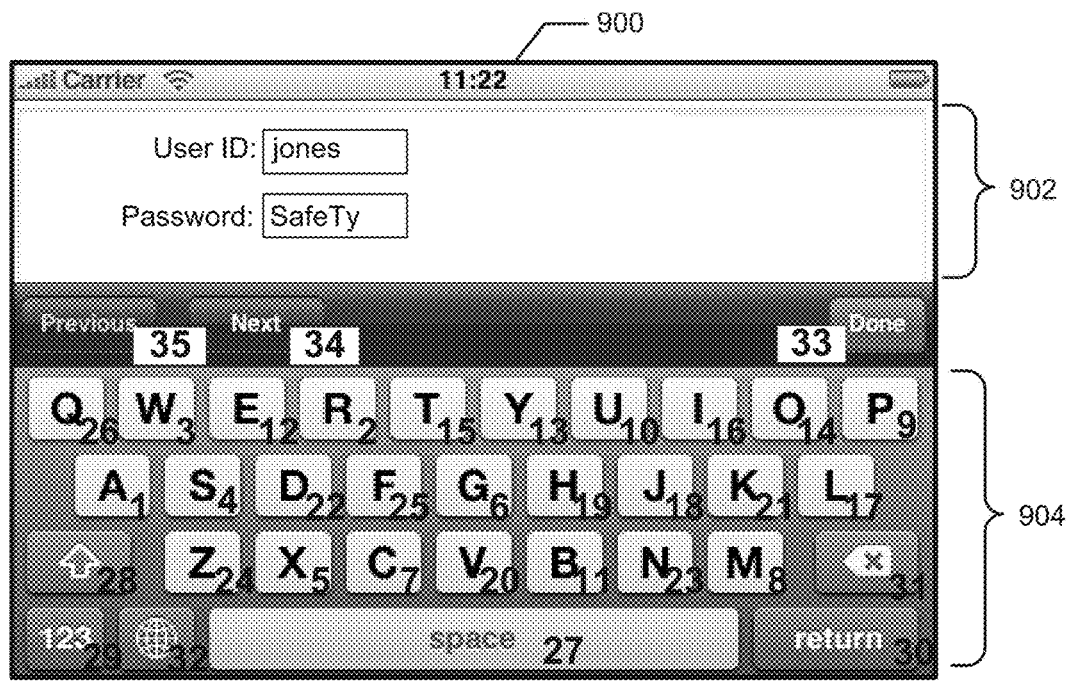
FIG. 9 illustrates a keyboard having keys that are displayed with random mappings between an ordered set of letters and randomly selected numbers, according to some embodiments of the present disclosure.
FIG. 10 illustrates operations for determining a user ID and password from speech recognition of user selections among the randomly selected numbers that are then mapped to the ordered set of letters in FIG. 9, according to some embodiments of the present disclosure.

FIG. 9 illustrates a keyboard that is displayed on a display device with graphical keys that are displayed containing different pairings of the symbols mapped between the defined order set of symbols and the random order set of symbols based on mapping information generated by an electronic device. In the example embodiment of FIG. 9, the keyboard keys are displayed with different pairings of mappings between an ordered set of letters and randomly selected numbers. The letters of the keyboard keys are arranged to provide a QWERTY layout, although other keyboard key layouts such as alphabetic order may be used.

In another embodiment, the keys are displays with mappings between an ordered set of letters and randomly selected letters. Thus, each key can be displayed with two letters, one being a conventional ordered letter expected for a key and another being a randomly selected letter.

Displaying two adjacent symbols on each key can be selectively activated and deactivated. For example, the electronic device may determine whether a secure entry mode for user input is active for an application. Based on determining that the secure entry mode is active, the electronic device can display a keyboard having a plurality of graphical keys containing different pairings of the symbols mapped between the defined order set of symbols and the random order set of symbols based on the mapping information. In contrast, based on determining that the secure entry mode is not active, electronic device can display a keyboard having a plurality of graphical keys containing the symbols of the defined order set of symbols without displaying adjacent symbols of the random order set of symbols.

FIG. 10 illustrates operations for determining a user ID and password from speech recognition of user selections among the randomly mapped numbers that are then mapped to the ordered set of letters in FIG. 9, according to some embodiments of the present disclosure. User ID and password entry prompts are displayed in a portion 902 of the display 900. The user desires to respond by entering a user ID "jones" and a password "SafeTy". Referring to the keyboard 904, the user speaks the number sequence corresponding to the user ID "jones" which is "18 14 23 12 4". The electronic device uses the mapping information between the lettered keys and the mapped random numbers associated with those keys to identify the corresponding user ID letter sequence for "jones", which it provides to an application. To enter the password "SafeTy", the user refers to the keyboard 904 and speaks the number sequence "28 4 1 25 28 15 13". The electronic device uses the mapping information between the lettered keys and the mapped random numbers associated with those keys to identify the corresponding user password sequence for "SafeTy", which it provides to an application.

As shown in FIG. 9, any user selectable indicia displayed on the display device 900 can be mapped through the mapping information to symbols of the random order set of symbols which may be displayed adjacent to such indicia. For example, the capitalization symbol has been mapped to 28, the number selection symbol has been mapped to 29, the space key has been mapped to 27, the return key has been mapped to 30, the delete symbol has been mapped to 31, the next screen key has been mapped to 34, the previous screen key has been mapped to 35, and the done key has been mapped to 33. Accordingly, the user can further obscure the operations being performed by the user's spoken commands through use of the randomly numbers mapped to the associated user selectable commands.

Figures 11, 12:
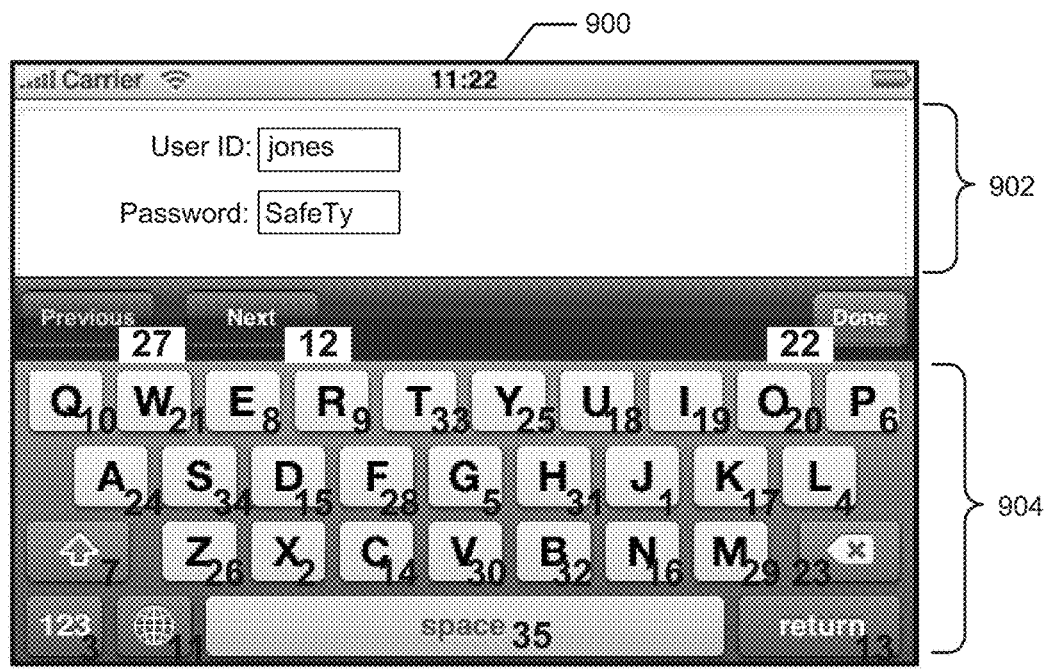
FIG. 11 illustrates a keyboard having keys that are displayed with a new random mapping between the ordered set of letters and randomly selected numbers based on a user's selection of one of the keys of FIG. 9, according to some embodiments of the present disclosure.
FIG. 12 illustrates operations for determining a user ID and password from speech recognition of user selections among the randomly selected numbers that are then mapped to the ordered set of letters in the sequence of FIGS. 9 and 11, according to some embodiments of the present disclosure.

FIG. 11 illustrates a keyboard having keys that are displayed with a new random mapping between the ordered set of letters and randomly selected numbers based on a user's selection of one of the keys of FIG. 9, according to some embodiments of the present disclosure. Accordingly, responsive to the user entry of the letter "j" while observing the keyboard of FIG. 9 during entry of the user ID, the electronic device generates a random mapping shown in FIG. 11 between the ordered set of letters and randomly mapped numbers. Thus, the user now views the keyboard of FIG. 11 to identify the number corresponding to the letter "o". The sequence of further random mappings can be generated to provide new keyboard displays for further user selections among the randomly mapped numbers while entering the remainder of the user ID and then the password.

FIG. 12 illustrates operations for determining a user ID and password from speech recognition of user selections among the randomly selected numbers that are then mapped to the ordered set of letters in the sequence of FIGS. 9 and 11, according to some embodiments of the present disclosure. The user speaks the number sequence 18 and 20 to cause the electronic device to identify the letter sequence "jo" as part of the user ID, which is provided to an application.

Figure 15:
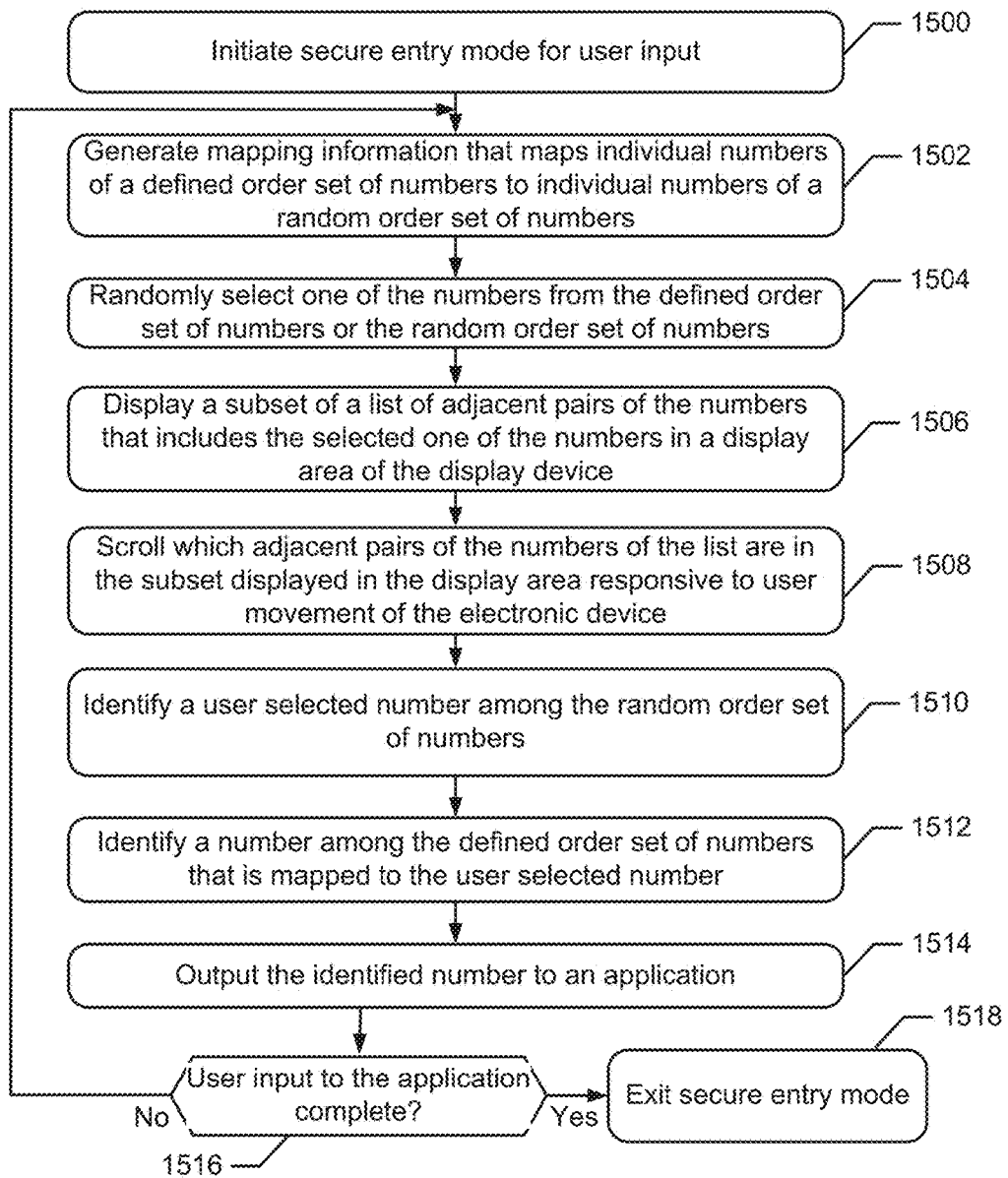
FIG. 15 illustrates operations for displaying the set of lists of FIGS. 13a-13c having randomly selected initial alignment in a display area, according to some embodiments of the present disclosure.

FIGS. 13a-13c illustrate a set of lists of adjacent pairs of symbols mapped between a defined order set of numbers and a random order set of numbers with the lists each having a randomly selected initial alignment in a display area, according to some embodiments of the present disclosure. FIG. 14 illustrates operations for receiving numbers by speech recognition of user selections among the sequence of the random order set of numbers in FIGS. 13a-13c to determine a security PIN according to some embodiments of the present disclosure. FIG. 15 illustrates operations for displaying the set of lists of FIGS. 13a-13c having randomly selected initial alignment in a display area, according to some embodiments of the present disclosure.

The electronic device can display a list of adjacent pairs of the symbols mapped between the defined order set of symbols and the random order set of symbols based on the mapping information. However, some electronic devices, such as a wearable electronic device, may have a display having insufficient viewable display area to display the entire list. For example, in FIGS. 13a-13c, a subset of the list of symbols is displayed in a viewable display area (1300) of the display device. Because of the size of the symbols (illustrated as numbers) and/or the resolution of the display device, only about four symbols can be simultaneously viewed in the vertical direction within the display area 1300 of the display device. A user can therefore scroll through the list of symbols by, for example, moving the electronic device (e.g., pitching the electronic device up or down). For example, when the electronic device is a Google Glass, the user may look up to scroll upward in the listing and looked down to scroll downward in the listing. When implemented in a smart watch, the user may tilt the wrist in alternative directions to cause corresponding alternative changes in the direction of scrolling. The user may additionally or alternatively tap the electronic device or speak a command (e.g., scroll up) to scroll through the lists in a desired direction. The microphone 642 and/or motion sensor 644 of FIG. 6 may be used to interpret a user's scroll command.

A risk to the user is introduced by the ability for another person to observe the users head movements which can be understood to be an indication of whether the next number in a sequence of numbers to be entered is greater than or less than a previous selected number or otherwise positioned related to the previous selected number that has been entered. Moreover the amount of time the person looks upward and/or the number of scroll command entered by a user can be understood by the other person as a distance that the next entered number is from the previous entered number. In this manner, the security of the users entered information may be compromised.

As shown in FIGS. 13a-13c, the bottom of the lists may be functionally connected along functional loop 1306 to the top of the lists so that the lists do not have a top or bottom but instead loop continuously. Accordingly, a user may scroll downward through the lists past "0" in the defined order list (i.e., left column) to further view the lists from the top "1" (i.e., left column) onward and, vice versa, may scroll upward through lists past "1" (i.e., left column) to further view the lists from the bottom "0" (i.e., left column) upward. Allowing a user to wrap-around through the lists may further inhibit another person's ability to determine how a next number in a sequence selected by the user is positionally related to a previously selected number. Thus, for example after looking-up the number 8 in the left column the user can scroll downward to reach number "1" in the left column instead of necessarily looking upward to reach number "1" in the left column.

In accordance with some further embodiments of the present disclosure, the electronic device randomly selects a number from among the list that will be displayed at a defined location within the viewable display area. For example, the randomly selected number can be centered within the viewable display area. The random selection can be repeated before each user selection so that the list is scrolled between user selections and the user's further list scrolling commands are thereby randomly decoupled from the previous user selections among the list. Thus, for example instead of initially centering the portion of the list on the same selected number within the lists (e.g., number "5" in the left column) or maintaining the lists as they were displayed immediately before a user selection, the lists can be scrolled to become initially centered based on a randomly selected number within the lists.

These and further embodiments will be described in the context of example of FIGS. 13a-13c, 14, and 15. In the example of FIGS. 13a-13c, 14, and 15, the electronic device displays two columns of numbers. The left column of numbers is arranged in sequential order and the right column is a random order listing of numbers.

An application, an operating system, or a user of the electronic device can initiate (block 1500, FIG. 15) a secure entry mode for providing user input to the application. During the secure entry mode, the electronic device generates (block 1502, FIG. 15) mapping information that maps individual numbers of a defined order set of numbers (e.g., left column of numbers) to individual numbers of a random order set of numbers (e.g., the right column of numbers). The electronic device randomly selects (block 1504, FIG. 15) one of the numbers "6" from the defined order set of numbers or the random order set of numbers. A subset of a list of adjacent pairs of the numbers that includes the selected one of the numbers is displayed (block 1506, FIG. 15) in a viewable display area (1300) of the display device. In FIG. 13a the subset of real numbers is 5-8 and the corresponding randomly mapped numbers is 4, 9, 5, 8 are displayed together within the viewable display area 1300. A graphical indicia (e.g., ellipses) may be displayed at the top/bottom of the display area 1300 to indicate to the user that the lists can be scrolled up-down. The selected one of the numbers "6" may be initially aligned with a defined location, such as centered adjacent to indicia 1302, within the viewable display area (1300) of the display device. The user controls the electronic device by, for example, moving the electronic device (e.g., sensed by the motion sensor 644), to scroll (block 1508, FIG. 15) which adjacent pairs of the numbers of the list are in the subset displayed in the viewable display area 1300.

In the present example, the user desires to input a security PIN "160" to a PIN authorization function of an application. Viewing the portion of the lists shown in the viewable display area 1300 of FIG. 13a, which is aligned relative to the number "6", the user scrolls upward through the list to see the first PIN number "1" in the left column and observe the mapped random number in the right column.

The columns of numbers may form a continuous loop. The top of the illustrated columns of numbers may be functionally connected to the bottom of the illustrated columns of numbers so that, for example, the user may scroll downward past the bottom numbers in the illustrated columns (e.g, real number "0" in left column) to view the top numbers in the illustrated columns (e.g., real number "1" in left column), and vice versa may scroll upward past the top of the illustrated numbers to view the bottom of the illustrated numbers. A user may thereby continue scrolling downward to see the entire lists of numbers and which can repeat in a circular manner. A user may correspondingly continue to scroll upward to see the entire lists of numbers and which can repeat in a circular manner.

The user selects number "3", which the electronic device identifies (block 1510, FIG. 15) as a user selection among the random order set of numbers (e.g., the right list of numbers). The user may select a number by speaking the number or provide a selection command (e.g., spoken command, tapping the electronic device, etc.) while the number to be selected is aligned with the indicia 1302. The indicia 1302 may alternatively be provided as a change in characteristics (e.g., shading, color, size, italics, underlining, etc.) of a number that can be presently selected.

The electronic device uses the received number "3" to identify (block 1512, FIG. 15) first PIN number "1" among the defined order set of numbers (e.g., the left list of numbers). The identified number "1" is output (block 1514, FIG. 15) to the PIN authorization function of an application.

Because the user's PIN input to the PIN authorization function is not yet complete (determined at Block 1516), the user sequentially enters the other PIN numbers by repeating the operations of Blocks 1502-1514. Further security is provided by, before each of the repetitions, replacing the random order set of symbols (right column) with another random order set of symbols and by randomly selecting another number among the lists for alignment within the viewable display area 1300 of the display device.

These repeated operations are further explained in detail for the next two PIN numbers. Continuing the example PIN entry for the second PIN number (i.e., "6"), the electronic device generates (block 1502) new mapping information that maps individual numbers of a defined order set of numbers (e.g., left column of numbers) to individual numbers of a random order set of numbers (e.g., the right column of numbers). The electronic device randomly selects (block 1504, FIG. 15) one of the numbers "8" from the defined order set of numbers or the random order set of numbers. A subset of a list of adjacent pairs of the numbers that includes the selected one of the numbers "8" is displayed (block 1506, FIG. 15) in a viewable display area (1300) of the display device, as shown in FIG. 13*b*. The selected one of the numbers "8" is initially aligned with a defined location, such as centered adjacent to indicia 1302, within the viewable display area (1300) of the display device.

The user controls the electronic device by, for example, moving the electronic device, to scroll (block 1508, FIG. 15) which adjacent pairs of the numbers of the list are in the subset displayed in the viewable display area 1300. Viewing the portion of the lists shown in the viewable display area 1300 of FIG. 13*b*, the user scrolls along direction 1304 upward through the lists to see the second PIN number "6" in the left column and observe the mapped random number (i.e., "9") in the right column. The user selects number "9", which the electronic device identifies (block 1510, FIG. 15) as a user selection among the random order set of numbers (e.g., the right column of numbers). The electronic device uses the received number "9" to identify (block 1512, FIG. 15) the second PIN number "6" among the defined order set of numbers (e.g., the left list of numbers). The identified number "6" is output (block 1514, FIG. 15) to the PIN authorization function of the application.

Continuing the example PIN entry for the third PIN number (i.e., "0"), the electronic device generates (block 1502) new mapping information that maps individual numbers of a defined order set of numbers (e.g., left column of numbers) to individual numbers of a random order set of numbers (e.g., the right column of numbers). The electronic device randomly selects (block 1504, FIG. 15) one of the numbers "3" from the defined order set of numbers or one of the numbers "1" from the random order set of numbers. A subset of a list of adjacent pairs of the numbers that includes the selected one of the numbers (i.e., "3" or "1") is displayed (block 1506, FIG. 15) in a viewable display area (1300) of the display device, as shown in FIG. 13*c*. The selected one of the numbers (i.e., "3" or "1") is initially aligned with a defined location, such as centered adjacent to indicia 1302, within the viewable display area (1300) of the display device.

The user controls the electronic device by, for example, moving the electronic device, to scroll (block 1508, FIG. 15) which adjacent pairs of the numbers of the list are in the subset displayed in the viewable display area 1300. Viewing the portion of the lists shown in the viewable display area 1300 of FIG. 13*c*, the user scrolls along direction 1304 downward through the lists to see the real number "0" in the left column and observe the mapped random number (i.e., "7") in the right column. The user selects number "7", which the electronic device identifies (block 1510, FIG. 15) as a user selection among the random order set of numbers (e.g., the right list of numbers). The electronic device uses the received number "7" to identifies (block 1512, FIG. 15) the third PIN number "0" among the defined order set of numbers (e.g., the left list of numbers). The identified number "0" is output (block 1514, FIG. 15) to the PIN authorization function of the application.

Referring to FIG. 14, the users thereby speaks the number sequence "397" pursuant to the respective sequence of displayed mapping information of FIGS. 13*a*-13*c* to cause the electronic device to provide the number sequence "160" to the PIN authorization function of the application. When the user input to the PIN authorization function of the application is complete (block 1516), the secure entry mode for user input can be terminated (block 1518).

In this manner, not only may the two lists be randomly remapped between user selections, a location within the lists where the user begins scrolling or otherwise moving through the lists can be randomly changed between user selections and the user may continue scrolling in one direction to see all numbers in the lists. Consequently, a person who overhears a number sequence spoken by the user and/or who observes how the user scrolls or otherwise moves through the list will not be provided with information that would be usable to attempt to decipher what data the user is entering into the electronic device.

The operations and methods disclosed in the context of FIGS. 13*a*-13*c* can be extended to enable a user to view other types of symbol layouts that may too large to be viewed in their entirety within the viewable display area of a display device. For example, the electronic device may display only a portion of a keypad (e.g., FIGS. 7*a*-7*d*) or only a portion of a keyboard (e.g., FIGS. 9 and 11) in the viewable display area of a display device. The entire keypad or keyboard can be functionally managed as a canvas with a portion thereof being viewable within the display area of the display device. A user may control the electronic device to scroll in various directions along the keypad or keyboard canvas to view other portions thereof, such as responsive to head movements of a head worn sensor (e.g., Google Glass). The user may continue scrolling in one direction past one edge of the keypad or keyboard canvas to wrap-around and view the opposite edge of the keypad or keyboard canvas. After each user selection of a symbol within a symbol layout, the electronic device can randomly shift the viewable display area to be located at randomly selected location within the canvas. Accordingly, the user's commands for scrolling through the displayed portions of a symbol layout when selecting a sequence of the symbols may not identify to another person the relative positions of a sequence of selected symbols within the symbol layout.

In some other embodiments the user can provide spoken commands to the electronic device to scroll in defined directions along a symbol layout canvas. In one embodiment, the user may provide spoken commands of "Up", "Down", "Left", "Right", "Right Upward Diagonal", etc. to cause the electronic device to scroll in corresponding directions along the symbol layout canvas. Because this approach may enable another person to determine the positional relationship between a sequence of symbols that a user selects, some further embodiments are directed to the electronic device obscuring the directional relationships by randomly mapping letters or other symbols or words that the user can speak to provide directional scrolling commands to the electronic device. A new random mapping can be generated responsive to each user selection of a symbol.

For example, the electronic device may randomly map ordered entries in a list of the scroll commands "Up", "Down", "Left", "Right", "Right Upward Diagonal", etc. to which the device can perform to ordered entries in a list of words that the user can speak "B", "D", "A", "C", "F", etc. to perform the respective commands (e.g., speak "B" to perform "Up" scroll).

Referring again to FIG. 13a, the electronic device has randomly assigned the letter "A" to the up scroll direction (arrow 1304) and the letter "B" to the downward scroll direction. The user may thereby speak the letter "A" to cause the electronic device to scroll upward or speak the letter "B" to cause the electronic device to scroll downward along the lists shown in FIG. 13a. Referring to FIG. 13b, the electronic device responds to the user selecting from among the lists in FIG. 13a by randomly assigned the letter "B" to the up scroll direction (arrow 1304) and the letter "A" to the downward scroll direction. The user may thereby speak the letter "B" to cause the electronic device to scroll upward or speak the letter "A" to cause the electronic device to scroll downward along the lists shown in FIG. 13b. Referring to FIG. 13c, the electronic device responds to the user selecting from among the lists in FIG. 13b by randomly assigned the letter "C" to the up scroll direction (arrow 1304) and the letter "D" to the downward scroll direction. The user may thereby speak the letter "C" to cause the electronic device to scroll upward or speak the letter "D" to cause the electronic device to scroll downward along the lists shown in FIG. 13c.

Figure 16A:
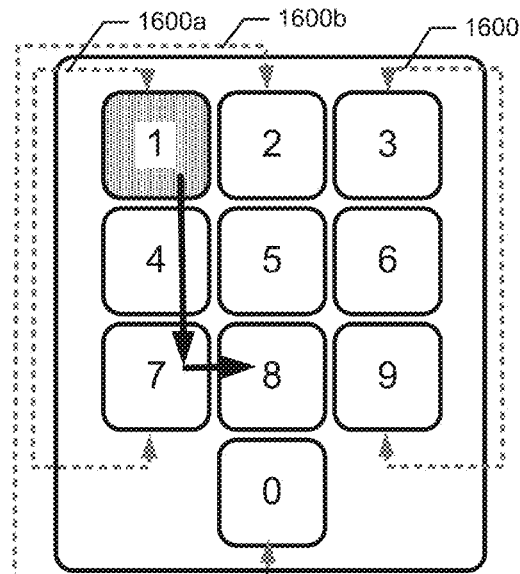
FIGS. 16a-16d illustrate a sequence of displayed keypads, each keypad having a randomly selected initial placement of a selectable indicia on the keypad, according to some embodiments of the present disclosure.

Further Operations and Configurations of Ordered Keys to Provide a Secure Input Mode FIG. 16a illustrates a keypad displayed by a display device, such as by the display device 100 of Google Glass or another wearable or portable electronic device. When the keypad is viewed on some types of electronic devices it may not be possible or practical for the user to select keys by touch. Google Glass does not have a touch interface on the display device 100 because of its proximity to the wearer's eye and tiny size, and some other electronic devices may have a touch interface but have insufficient touch position accuracy to distinguish between touch selections among small size adjacent keys of a keypad, keyboard, or other arrangement of ordered keys being displayed. Devices such as Google Glass provide voice recognition capability, but as explained above a spoken PIN or other security code may be overheard by another person, rendering the PIN or code unsecure.

In FIG. 16a, the electronic device displays a selection indicia, which is shown by shading of the number "1" key. Through navigation commands the user moves the selection indicia from the number "1" key to another desired number key which then obtains the characteristic shading. The user then generates a selection signal to cause the electronic device to identify the shaded number key as being selected by the user. The selection indicia may be indicated by any change in a characteristic of at least a portion of a key including, but not limited to, color, shading, border thickness, shadowing, background, animated motion, etc. For example, a location of the selection indicia may be indicated by animating motion of a key (e.g., wiggling key), so once the selection indicia is moved therefrom animated motion of that key is ceased.

In the example environment of Google Glass and assuming the user desires to select the "8" key when the selection indicia is presently located at the "1" key, the user can look downward or say "down 2" as a command (e.g., signal) to move the shaded selection indicia downward two keys and then look right or say "right 1" as a command to move the shaded selection indicia right one key to highlight the number "8" key, and can then say "select" as a command (e.g., another signal) or tap on a housing of Google Glass to trigger selection of the number "8" key as the user's input. The microphone 642 and/or motion sensor 644 of FIG. 6 may be used to interpret the user's navigation and selection commands.

A risk to the user is introduced by the ability for another person to observe the users head movements or movements of the electronic device which can be understood to be an indication of whether the next number in a sequence of numbers to be entered is greater than or less than a previous selected number or otherwise positioned on the keypad related to the previous selected number that has been entered. Moreover the amount of time the person looks upward and/or the number of scroll commands entered by a user can be understood by the other person as a distance along the ordered keys that the next entered number is from the previous entered number. In this manner, the security of the users entered information may be compromised.

Figure 19:
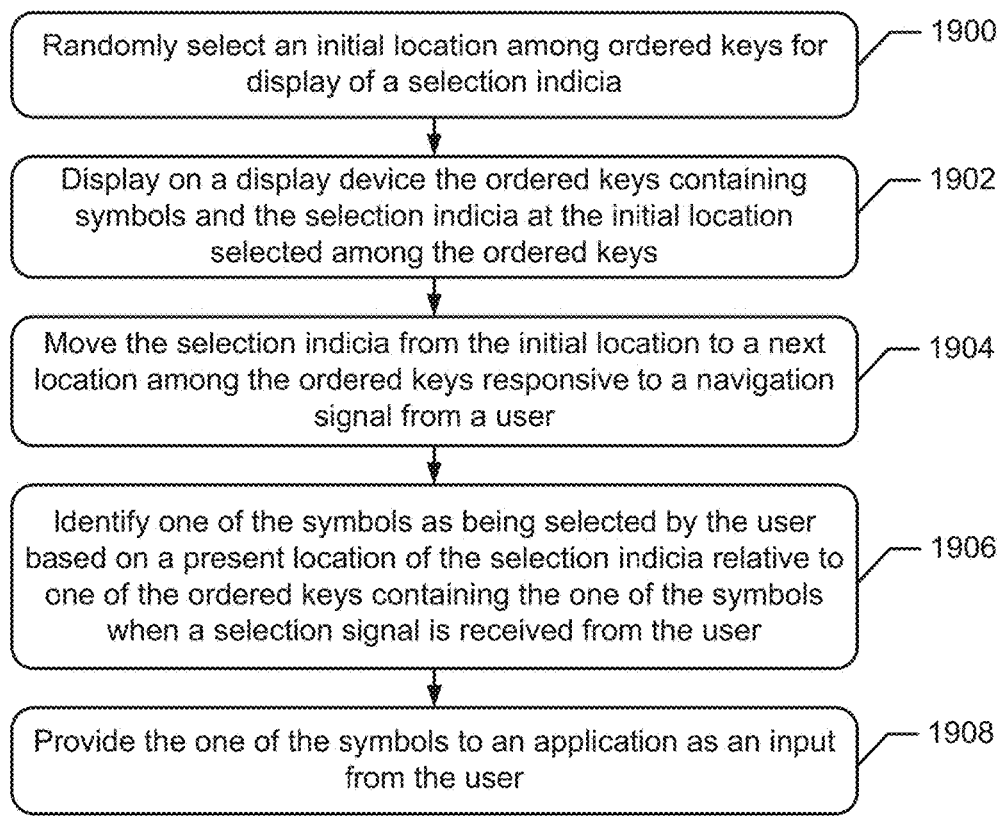
FIGS. 19 and 20 illustrates flowcharts of operations that may be performed by an electronic device to carry out the process of, for example, FIGS. 16a-16d and/or FIGS. 18a-18c according to some embodiments of the present disclosure.

However, in accordance with some embodiment, a secure entry mode is provided by the electronic device randomly selecting an initial location among the keypad for display of the selection indicia. A flowchart of example operations that may be performed by an electronic device to carry out the secure entry mode is shown in FIG. 19. Referring to FIG. 19, the initial location of the selection indicia among ordered keys is randomly selected (block 1900) to be the number "1" key. The keypad is displayed (block 1902) with numbers (e.g., symbols) and with the selection indicia at the initial location selected among the ordered keys (i.e., number "1" key). The selection indicia is moved (block 1904) from the initial location to a next location among the ordered keys responsive to a navigation signal from a user. One of the symbols is identified (block 1906) as being selected by the user based on a present location of the selection indicia relative to one of the ordered keys containing the one of the symbols when a selection signal is received from the user. The one of the symbols is provided (block 1908) to an application as an input from the user.

As shown in FIG. 16a, the bottom keys of the keypad may be functionally connected along functional loops 1600a-c to be adjacent to the top of the keypad keys and, similarly, the side keys of the keypad can be functionally connected to be adjacent to the other side keys of the keypad. Accordingly, a user may move the selection indicia downward from key "7" to reach key "1" and vice versa. Similarly, a user may move the selection indicia right from key "3" to reach key "1" and vice versa. Allowing a user to wrap-around between the edge keys may further inhibit another person's ability to determine how a next number in a sequence is positionally related to a previously selected number.

Figure 16B:
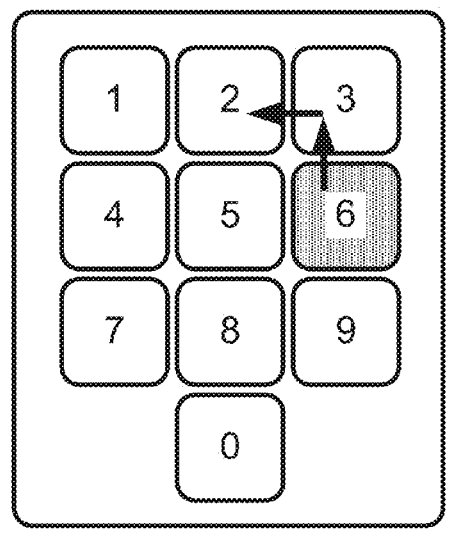
Figure 16C:
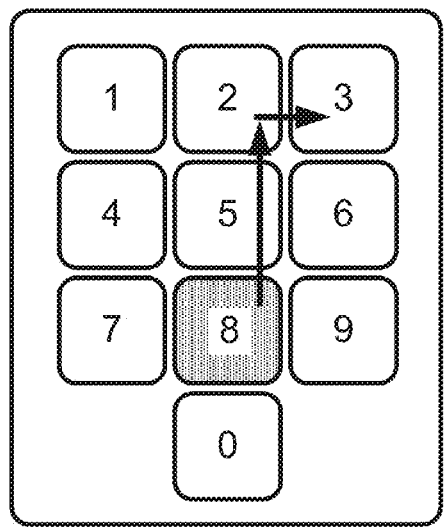
Figure 16D:
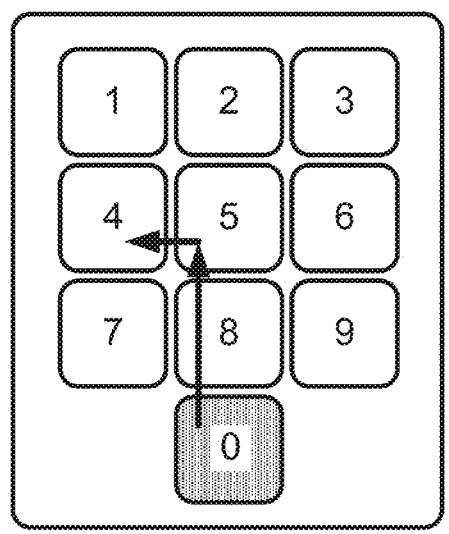

To enter a sequence of numbers the user repeats for each number the process of moving the selection indicia around the keypad to the next number in the sequence and then selecting that number. However, in accordance with some further embodiments, the electronic device responds to each user selection of a number in the sequence by repeating the random selection of another initial location among the ordered keys for display of the selection indicia. For example, referring to FIG. 16b, following the user's selection of "8" in FIG. 16a, the electronic device randomly selects the "6" key to be the new initial location of the selection indicia. The user then moves the selection indicia to the "2" key which the user selects as the next number in the sequence. Responsive to the user's selection among the keys in FIG. 16b, the electronic device randomly selects the "8" key to be the new initial location of the selection indicia which is displayed in FIG. 16c. The user then moves the selection indicia to the "3" key which the user selects as the next number in the sequence. Responsive to the user's selection among the keys in FIG. 16c, the electronic device randomly selects the "0" key to be the new initial location of the selection indicia which is displayed in FIG. 16d. The user then moves the selection indicia to the "4" key which the user selects as the next number in the sequence.

Figure 16E:
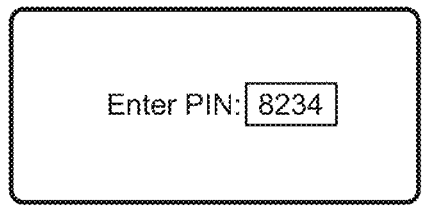
FIG. 16e illustrates numbers sequentially input by a user's navigation of the selectable indicia displayed in FIGS. 16a-16d to form a security PIN according to some embodiments of the present disclosure.

Referring to FIG. 16e, through the operations of FIG. 16a-d and FIG. 19, the user has used a secure entry mode to enter the PIN sequence "8234" which is provided to an a PIN authorization function of an application. Consequently, anyone overhearing the voice selections by the user without being able to also simultaneously view the displayed keypad will not be able to properly decipher the necessary PIN. Similarly, when a user moves the selection indicia around the keypad through head movements, tilting of the electronic device, or other movement, although the movements can be observed by another person the other person would not be able to accurately determine the positional relationship between a sequence of numbers the user has entered through the keypad and therefore cannot decode the user's PIN or other security code.

Figure 17:
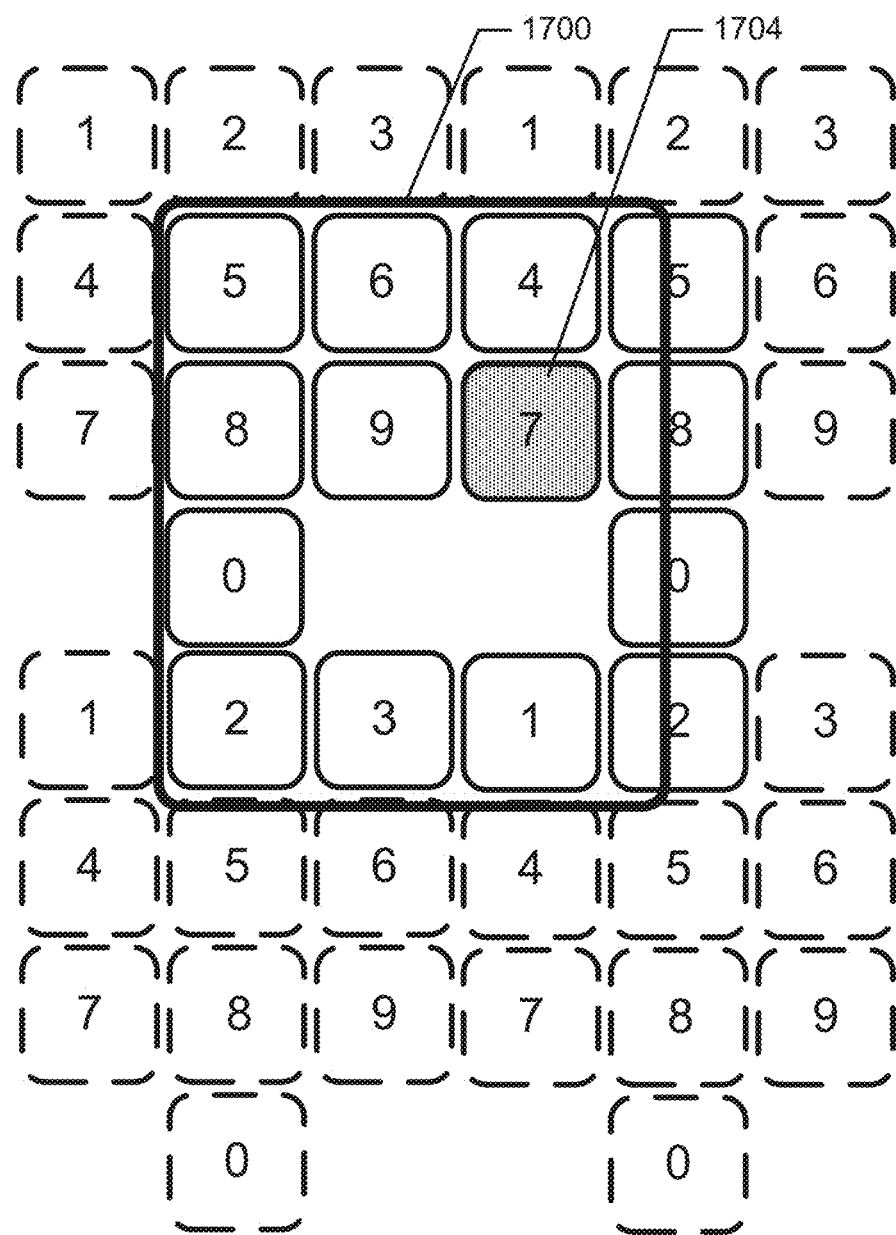
FIG. 17 illustrates another user interface having replicated keypads arranged adjacent to each other and between which a user can navigate a selection indicia.

FIG. 17 illustrates another embodiment of a user interface that has replicated keypads which are arranged adjacent to each other. Referring to FIG. 17, a display window 1700 illustrates portions of four adjacent replicated keypads, although any number of replicated keypads may be used. The keypad keys that are at least partially displayed within the window 1700 are shown with solid lines. In contrast, the keypad keys that are not displayed are shown with dashed lines. A selection indicia 1704 is illustrated by shading of number "7". A user desiring to select the number "8", may navigate the selection indicia 1704 two keys to the left to reach "8" or may instead navigate the selection indicia 1704 one key to the right to reach "8". Similarly, a user desiring to select the number "1", may navigate the selection indicia 1704 two keys upward to reach "1" or may instead navigate the selection indicia 1704 one key downward to reach "1".

The display window 1700 can pan right and left and can similarly pan up and down to expose further portions of the adjacent keypads responsive to the selection indicia 1704 being moved in corresponding directions. Alternatively, the display window 1700 can be configured to simultaneously display larger portions of a plurality of the adjacent keypads or all of the adjacent keypads.

In this manner, a user can move the selection indicia 1704 in any direction across the same keypad and between the adjacent replicated copies of the keypad to reach and select any keys. The positional relationships between a string of numbers can thereby be masked from another person who is observing the user's navigation inputs but who cannot simultaneously see the corresponding displayed keypad layouts.

Although various embodiments have been described in the context of the user moving the selection indicia relative to non-movable keypad(s), in some other embodiments the selection indicia may be fixed in location while the user moves the keypad(s) and/or the user may move the selection indicia and the keypad(s) relative to each other to select among the displayed keys. The selection indicia may move at a substantially constant rate across the display window 1700 relative to the keypad enabling the user to select individual keys based on timing when the selection signal is provided (e.g., responsive to voice command, tapping the device, touch selection, etc.) when a desired key is aligned with the selection indicia. Alternatively, the keypad may move at a substantially constant rate across the display window 1700 relative to a selection indicia enabling the user to select individual keys based on timing when the selection signal is provided (e.g., responsive to voice command, tapping the device, touch selection, etc.) when a desired key is aligned with the selection indicia (e.g., which may correspond to the center of the display window 1700).

Although various embodiments have been described in the context of keypads, the operations provided by these embodiments may additionally be used with one or more displayed keyboards to provide a secure mode for user entry. Example non-limiting operations that may be performed relative to keyboards are now described with reference to FIGS. 18a-18c.

Figure 18A:
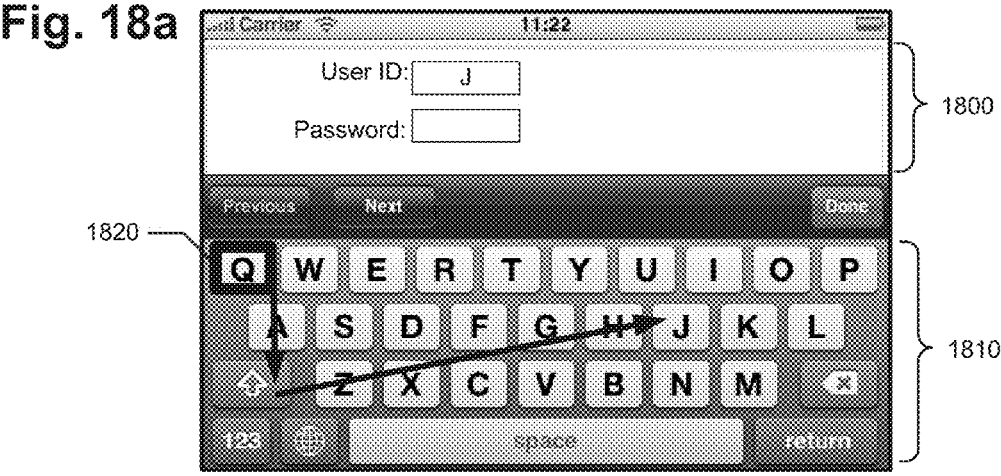
FIGS. 18a-18c illustrate a sequence of random initial locations within a keyboard for a selectable indicia that a user can navigation along the keyboard to select a keyboard symbol, according to some embodiments of the present disclosure.
Figure 18B:
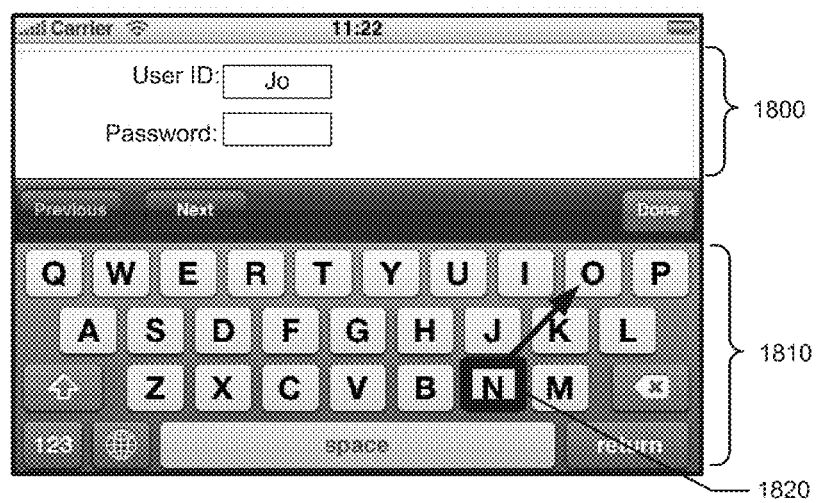
Figure 18C:
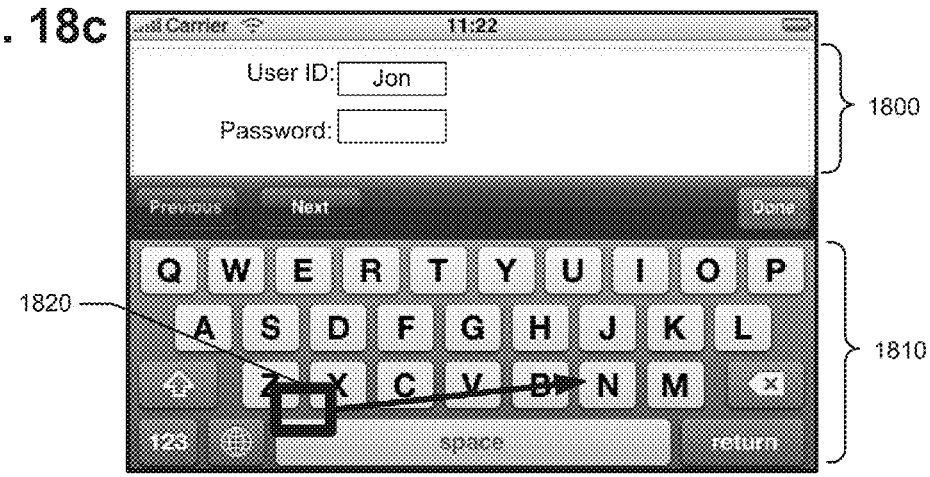

FIGS. 18a-18c illustrates a keyboard 1810 that is displayed on a display device with graphical keys containing different symbols (e.g., numbers, letters, space, cap-shift, delete, etc.). The keyboard keys are displayed with different pairings of mappings between an ordered set of letters and randomly selected numbers. The letters of the keyboard keys are arranged to provide a QWERTY layout, although other keyboard key layouts such as alphabetic order may be used.

In the example embodiments of FIGS. 18a-18c, a user responds to a query in display area 1800 requesting a User ID by steering a selection indicia 1820 around the keys to a desired key, selecting the key, and then repeating the steering of the selection indicia 1820 to a next desired key and selecting the desired key to enter each remaining symbol of the user's User ID. In accordance with some embodiments, a secure entry mode is provided by the electronic device randomly selecting an initial location among the keyboard for display of the selection indicia 1820.

Figure 20:
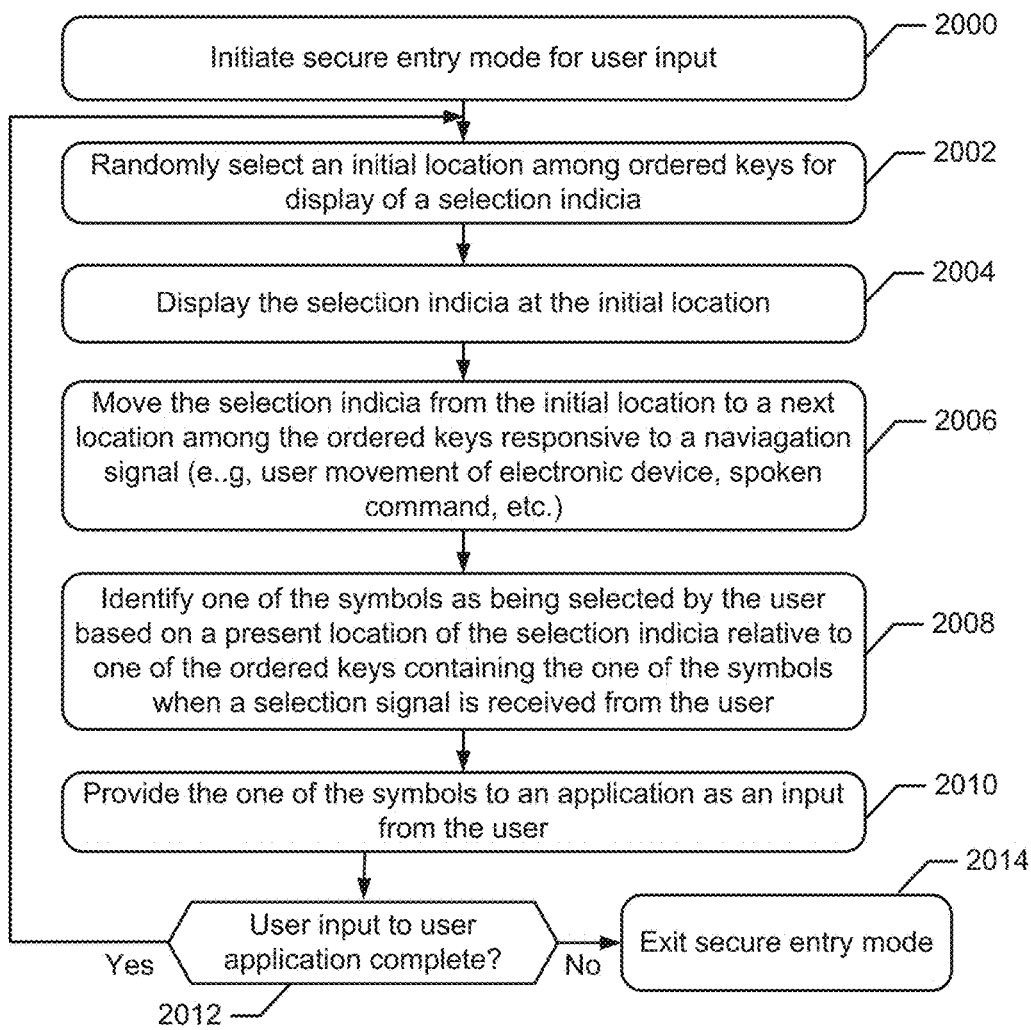

A flowchart of example operations that may be performed by an electronic device to carry out the secure entry mode is shown in FIG. 20. Referring to FIG. 18a-18c and FIG. 20, a secure entry mode is initiated (block 2000) for receiving user input using the displayed keyboard 1810. The electronic device randomly selects (block 2000) an initial location among the keys for display of a selection indicia 1820. In FIG. 18a the initial location for the selection indicia 1820 forms a border to the "Q" key. The selection indicia 1820 is moved (block 2006) from the initial location to a location of the cap-shift key responsive to a navigation signal from a user, which may be detected from user movement of the electronic device (e.g., tilting along a defined axis and/or vibration) and/or voice commands. The user provides a selection signal while the selection indicia 1820 is aligned with the cap-shift key. The user then moves the selection indicia 1820 to the "J" key and triggers another selection signal to cause the electronic device to identify (block 2008) the "J" symbol as being the user's selection. The letter capital "J" is provided (block 2010) to the application. Because user input of the User ID is determined (block 2012) to not be complete, the operations loop back to block 2002 so that the electronic device randomly selects another initial location among the keys for display of the selection indicia 1820.

Referring to FIG. 18b, the next of initial location is randomly selected (block 2002) to form a border to the "N" key. The selection indicia 1820 is moved (block 2006) from the initial location to the "o" key and triggers a selection signal to cause the letter "o" to be identified (block 2008) as user input. The letter "o" is provided (block 2010) to the application. Because user input of the User ID is determined (block 2012) to not be complete, the operations loop back to block 2002 so that the electronic device randomly selects another initial location among the keys for display of the selection indicia 1820, and repeats the operations of block 2004-2012 to allow the user enter a string of other symbols that form the User ID. As shown in FIG. 18c, the initial location randomly selected for display of the selection indicia 1820 does not need to be aligned with any one of the keys, but instead may be displayed anywhere on the keyboard 1810.

When the user input is determined (block 2012) to be complete, such as responsive to the user selecting the return key, the electronic device can exit or termite (block 2014) the secure entry mode. A string of the user selected symbols may then provided to the user application or the individual selected symbols may be provided on at a time when selected.

Accordingly, the secure entry mode of FIG. 18a-18c and FIG. 20 operates so that anyone overhearing the voice selections by the user without being able to also simultaneously view the displayed keyboard will not be able to properly decipher the necessary User ID. Similarly, when a user moves the selection indicia around the keyboard through head movements, tilting of the electronic device, or other movement, although the movements can be observed by another person the other person would not be able to accurately determine the positional relationship among the string of symbols the user has entered through the keyboard and therefore cannot decode the User ID, password, or other sensitive information.

In a manner similar to that disclosed in FIG. 17, the keyboard can be replicated and arranged adjacent to each other so that a user can navigate the selection indicia 1820 in any direction to move from the key arrangement of one keyboard to the key arrangement of another adjacent keyboard. The positional relationships between a string of keyboard selections can thereby be masked from another person who is observing the user's navigation inputs but who cannot simultaneously see the corresponding displayed keypad layouts.

The operations of any one or more of the embodiments shown and described with regard to FIGS. 16-20 may be combined with the operations of any one or more of the embodiments shown and described with regard to FIGS. 1-15. Thus, for example, the electronic device may generate mapping information that maps individual symbols of a defined order set of symbols to individual symbols of a random order set of symbols, and display within the ordered keys different pairings of the symbols mapped between the defined order set of symbols and the random order set of symbols based on the mapping information. The electronic device may display within each of at least some of the ordered keys a pairing of a letter selected among the defined order set of symbols and a number selected among the random order set of symbols that is mapped to the letter based on the mapping information. The electronic device can identify one of the symbols of the random order set of symbols as being selected by the user based on a present location of the selection indicia relative to one of the ordered keys containing the one of the symbols when a selection signal is received from the user, and identify a symbol of the defined order set of symbols that maps to the one of the symbols of the random order set of symbols that is identified as being selected by the user, based on the mapping information. The electronic device can then provide the symbol of the defined order set of symbols to the application as the input from the user.

Figure 21:
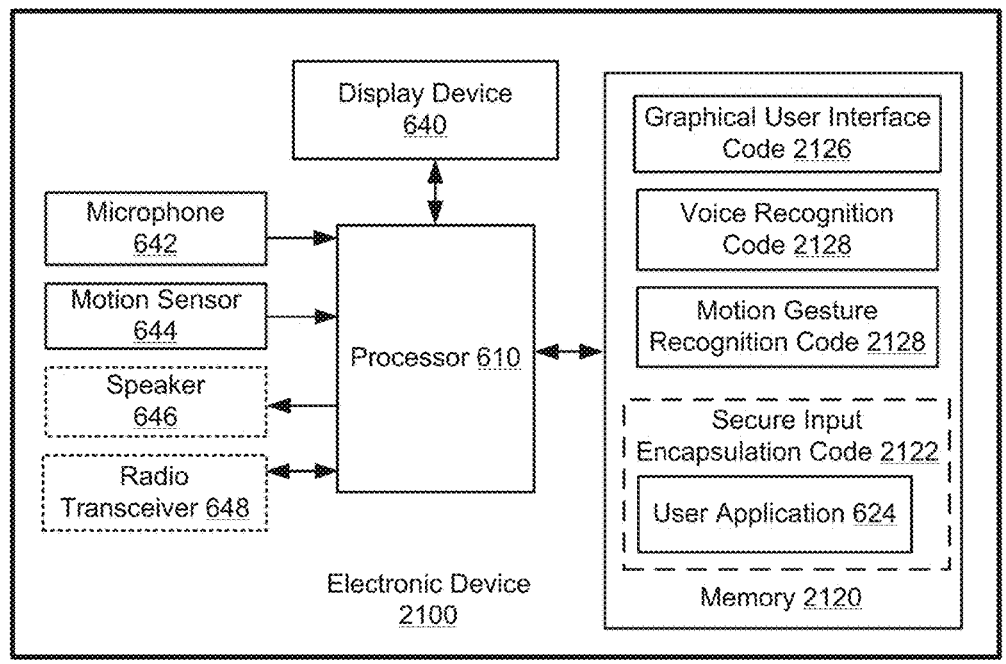
FIG. 21 is a block diagram of an electronic device configured according to some embodiments of the present disclosure.

FIG. 21 is a block diagram of another electronic device 2100 configured according to some embodiments of the present disclosure. Referring to FIG. 21, the electronic device 2100 includes a processor 610, a memory 620, a display device 640, a microphone 642, and a network interface which may include a radio access network transceiver 648 and/or a wired network interface. The processor 610, memory 620, display device 640, microphone 642, and transceiver 648 may be configured as described above regarding the electronic device 600 of FIG. 6.

The memory 2120 of the electronic device 2100 includes graphical user interface (GUI) code 2126, voice-recognition code 2128, motion gesture recognition code 2129, and secure input encapsulation code 2122. The GUI code 2126 may operate to display the user interface having ordered keys, such as a keyboard, keypad, etc. The GUI code 2126 can furthermore operate to display the selection indicia at locations defined by the secure input encapsulation code 2122. The voice-recognition code 2128 is configured to identify voice commands and other input received from a user via the microphone 642. The motion gesture recognition code 2129 is configured to identify commands and other input received from a user via the motion sensor 644. The commands and other input can correspond to navigation signals, selection signals, and other input which can be received from a user according to one or more embodiments disclosed herein.

Figure 22:
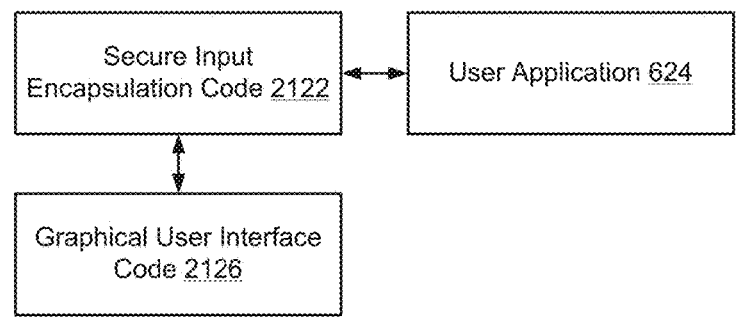
FIG. 22 is a block diagram of secure input encapsulation code that intervenes in communications between a graphical user interface code and a user application according to some embodiments of the present disclosure.

A user application 624 is encapsulated by the secure input encapsulation code 2122. FIG. 22 is a block diagram of the secure input encapsulation code 2122 that intervenes in communications between the GUI code 2126 and the user application 624 according to some embodiments of the present disclosure. The secure input encapsulation code 2122 "wraps around" the user application 624 to intercept application programming interface (API) calls from the user application 624 to the GUI code 2126. The secure input encapsulation code 2122 may similarly intercept API calls from the GUI code 2126 to the application 624.

The encapsulation code 2122 can thereby intercept a call made by the application 624 to an application interface for the GUI code 2126, which call may function to obtain input from the user. The encapsulation code 2122 can operate according to one or more of the embodiments of FIGS. 3-5, 7, 9, 11, 13, and 15-20 to provide a secure entry mode for obtaining the input from the user, and can provide the obtained user input through a call from the encapsulation code 2122 to an application interface for a defined function of the user application 624.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer program product, comprising:
   a non-transitory computer readable storage medium storing computer readable program code which when executed by a processor of an electronic device causes the processor to perform operations comprising:
   randomly selecting an initial location among an arrangement of ordered keys for display of a visible selection indicia, wherein the ordered keys are graphical input keys configured to accept user input;
   displaying, on a display device, the arrangement of the ordered keys containing symbols;
   displaying, on the display device, the visible selection indicia at the initial location selected among the arrangement of the ordered keys;
   moving the visible selection indicia from the initial location to a next location among the ordered keys responsive to a navigation signal from a user;
   identifying one of the symbols as being selected by the user based on the next location of the visible selection indicia relative to one of the ordered keys containing the one of the symbols when a selection signal is received from the user; and
   providing the one of the symbols to an application as an input from the user;
   providing a string of the symbols from the user to the application based on repeating, for respective symbols of the string of symbols, the following operations:
   randomly selecting another initial location among the arrangement of the ordered keys for display of the visible selection indicia;
   displaying on the display device the visible selection indicia at the another initial location selected among the arrangement of the ordered keys;
   moving the visible selection indicia from the another initial location to another next location among the ordered keys responsive to another navigation signal from the user; and
   identifying another one of the symbols as being selected by the user for the string of symbols based on a present location of the visible selection indicia relative to another one of the ordered keys containing the another one of the symbols when another selection signal is received from the user;
   wherein providing comprises providing the string of symbols including the one of the symbols and the another one of the symbols to the application as the input from the user.

2. The computer program product of claim 1, wherein:
   the displaying, on the display device, the arrangement of the ordered keys containing symbols and the displaying on the display device the visible selection indicia at the initial location selected among the arrangement of the ordered keys, comprises:
   displaying the arrangement of the ordered keys to define a key arrangement having graphical keys containing the symbols and with one of the graphical keys that includes the initial location being displayed with a characteristic that is different from the other graphical keys to illustrate the visible selection indicia; and
   the moving the visible selection indicia from the initial location to a next location among the ordered keys responsive to a navigation signal from a user comprises:
   responding to the navigation signal by changing the characteristic of the one of the graphical keys that includes the initial location to cease illustrating the selection criteria and changing a characteristic of another one of the graphical keys that includes the next location to illustrate the visible selection indicia.

3. The computer program product of claim 2, wherein the responding to the navigation signal by changing the characteristic of the one of the graphical keys that includes the initial location to cease illustrating the selection criteria and changing the characteristic of another one of the graphical keys that includes the next location to illustrate the visible selection indicia, comprises:
   ceasing animated motion of the one of the graphical keys that includes the initial location and initiating animated motion of the another one of the graphical keys that includes the next location.

4. The computer program product of claim 2, wherein the key arrangement displayed on the display device comprises a numeric keypad.

5. The computer program product of claim 2, wherein the key arrangement displayed on the display device comprises a keyboard.

6. The computer program product of claim 1, wherein the operations further comprise:
   generating mapping information that maps individual symbols of a defined order set of symbols to individual symbols of a random order set of symbols;
   displaying within the arrangement of the ordered keys different pairings of the symbols mapped between the defined order set of symbols and the random order set of symbols based on the mapping information;
   identifying one of the symbols of the random order set of symbols as being selected by the user based on a present location of the visible selection indicia relative to one of the ordered keys containing the one of the symbols when a selection signal is received from the user;

identifying a symbol of the defined order set of symbols that maps to the one of the symbols of the random order set of symbols that is identified as being selected by the user, based on the mapping information; and providing the symbol of the defined order set of symbols to the application as the input from the user.

7. The computer program product of claim 1, wherein randomly selecting the initial location among the arrangement of the ordered keys for display of the visible selection indicia, comprises:

determining whether a secure entry mode for user input is active for the application;

based on determining that the secure entry mode is active, performing the random selection of the initial location among the arrangement of the ordered keys for display of the visible selection indicia; and based on determining that the secure entry mode is not active, obtaining a defined constant value for the initial location among the arrangement of the ordered keys for display of the visible selection indicia.

8. The computer program product of claim 1, further comprising intercepting, by program code that encapsulates the application, a call made by the application to an application interface for user interface program code of the electronic device, and wherein the providing the one of the symbols to the application as the input from the user, comprises providing the one of the symbols by a call from the program code that encapsulates the application to an application interface for a defined function of the application.

9. The computer program product of claim 8, further comprising triggering the display of the visible selection indicia at the initial location selection among the ordered keys responsive to interception of the call made by the application to the application interface for user interface program code of the electronic device.

10. The computer program product of claim 1, wherein the arrangement of the ordered keys is a first arrangement, and further comprising a second arrangement of the ordered keys, and wherein the operations further comprise:

displaying the second arrangement of the ordered keys adjacent the first arrangement of the ordered keys, and moving the visible selection indicia from the first arrangement of the ordered keys to the second arrangement of the ordered keys responsive to the navigation signal from the user.

11. The computer program product of claim 1, wherein the initial location is randomly selected so that the display of the visible selection indicia occurs at a position that is not aligned with any one of the ordered keys.

12. A computer program product, comprising:

a non-transitory computer readable storage medium storing computer readable program code which when executed by a processor of an electronic device causes the processor to perform operations comprising:

randomly selecting an initial location among an arrangement of ordered keys for display of a visible selection indicia, wherein the ordered keys are graphical input keys configured to accept user input;

displaying, on a display device, the arrangement of the ordered keys containing symbols;

displaying, on the display device, the visible selection indicia at the initial location selected among the arrangement of the ordered keys;

moving the visible selection indicia from the initial location to a next location among the ordered keys responsive to a navigation signal from a user;

identifying one of the symbols as being selected by the user based on the next location of the visible selection indicia relative to one of the ordered keys containing the one of the symbols when a selection signal is received from the user;

providing the one of the symbols to an application as an input from the user;

generating mapping information that maps individual symbols of a defined order set of symbols to individual symbols of a random order set of symbols;

displaying within the arrangement of the ordered keys different pairings of the symbols mapped between the defined order set of symbols and the random order set of symbols based on the mapping information;

identifying one of the symbols of the random order set of symbols as being selected by the user based on a present location of the visible selection indicia relative to one of the ordered keys containing the one of the symbols when a selection signal is received from the user;

identifying a symbol of the defined order set of symbols that maps to the one of the symbols of the random order set of symbols that is identified as being selected by the user, based on the mapping information; and providing the symbol of the defined order set of symbols to the application as the input from the user;

wherein the displaying within the ordered keys different pairings of the symbols mapped between the defined order set of symbols and the random order set of symbols based on the mapping information, comprises:

displaying within each of at least some of the ordered keys a pairing of a letter selected among the defined order set of symbols and a number selected among the random order set of symbols that is mapped to the letter based on the mapping information.

13. An electronic device comprising:

a display device;

a user input interface;

a processor; and a memory coupled to the processor and comprising computer readable program code that when executed by the processor causes the processor to perform operations comprising:

randomly selecting an initial location among an arrangement of ordered keys for display of a visible selection indicia, wherein the ordered keys are graphical input keys configured to accept user input;

displaying, on the display device, the arrangement of the ordered keys containing symbols;

displaying, on the display device, the visible selection indicia at the initial location selected among the arrangement of the ordered keys;

moving the visible selection indicia from the initial location to a next location among the ordered keys responsive to a navigation signal from a user;

identifying one of the symbols as being selected by the user based on the next location of the visible selection indicia relative to one of the ordered keys containing the one of the symbols when a selection signal is received from the user input interface; and providing the one of the symbols to an application as an input from the user;
providing a string of the symbols from the user to the application based on repeating, for respective symbols of the string of symbols, the following operations:
randomly selecting another initial location among the arrangement of the ordered keys for display of the visible selection indicia;
displaying on the display device the visible selection indicia at the another initial location selected among the arrangement of the ordered keys;
moving the visible selection indicia from the another initial location to another next location among the ordered keys responsive to another navigation signal from the user; and
identifying another one of the symbols as being selected by the user for the string of symbols based on a present location of the visible selection indicia relative to another one of the ordered keys containing the another one of the symbols when another selection signal is received from the user input interface.

14. The electronic device of claim 13, wherein:
the displaying, on the display device, the arrangement of the ordered keys containing symbols and the displaying on the display device the visible selection indicia at the initial location selected among the arrangement of the ordered keys, comprises:
displaying the arrangement of the ordered keys to define a key arrangement having graphical keys containing the symbols and with one of the graphical keys that includes the initial location being displayed with a characteristic that is different from the other graphical keys to illustrate the visible selection indicia; and
the moving the visible selection indicia from the initial location to a next location among the ordered keys responsive to a navigation signal from a user comprises:
responding to the navigation signal by changing the characteristic of the one of the graphical keys that includes the initial location to cease illustrating the selection criteria and changing a characteristic of another one of the graphical keys that includes the next location to illustrate the visible selection indicia.

15. The electronic device of claim 13, wherein the operations further comprise:
generating mapping information that maps individual symbols of a defined order set of symbols to individual symbols of a random order set of symbols;
displaying within the arrangement of the ordered keys different pairings of the symbols mapped between the defined order set of symbols and the random order set of symbols based on the mapping information;
identifying one of the symbols of the random order set of symbols as being selected by the user based on a present location of the visible selection indicia relative to one of the ordered keys containing the one of the symbols when a selection signal is received from the user input interface;
identifying a symbol of the defined order set of symbols that maps to the one of the symbols of the random order set of symbols that is identified as being selected by the user, based on the mapping information; and
providing the symbol of the defined order set of symbols to the application as the input from the user.

16. The electronic device of claim 13, wherein the randomly selecting the initial location among the arrangement of the ordered keys for display of the visible selection indicia, comprises:
determining whether a secure entry mode for user input is active for the application;
based on determining that the secure entry mode is active, performing the random selection of the initial location among the arrangement of the ordered keys for display of the visible selection indicia; and
based on determining that the secure entry mode is not active, obtaining a defined constant value for the initial location among the arrangement of the ordered keys for display of the visible selection indicia.

17. The electronic device of claim 13,
further comprising intercepting, by program code that encapsulates the application, a call made by the application to an application interface of the user input interface of the electronic device, and
wherein the providing the one of the symbols to the application as the input from the user, comprises providing the one of the symbols by a call from the program code that encapsulates the application to an application interface for a defined function of the application.

18. The electronic device of claim 13, further comprising triggering the display of the visible selection indicia at the initial location selection among the ordered keys responsive to interception of the call made by the application to the application interface for user input interface of the electronic device.

* * * * *